(12) United States Patent
Takeda et al.

(10) Patent No.: US 8,140,241 B2
(45) Date of Patent: Mar. 20, 2012

(54) DRIVING ACTION ESTIMATING DEVICE, DRIVING SUPPORT DEVICE, VEHICLE EVALUATING SYSTEM, DRIVER MODEL CREATING DEVICE, AND DRIVING ACTION DETERMINING DEVICE

(75) Inventors: Kazuya Takeda, Nagoya (JP); Katunobu Itou, Tokyo (JP); Chiyomi Miyajima, Nagoya (JP); Koji Ozawa, Nagoya (JP); Hirokazu Nomoto, Tokyo (JP); Kazuaki Fujii, Tokyo (JP); Seiichi Suzuki, Tokyo (JP)

(73) Assignees: National University Corporation Nagoya University (JP); Equos Research Co., Ltd. (JP)

( * ) Notice: Subject to any disclaimer, the term of this patent is extended or adjusted under 35 U.S.C. 154(b) by 701 days.

(21) Appl. No.: 12/087,130

(22) PCT Filed: Dec. 27, 2006

(86) PCT No.: PCT/JP2006/326041
§ 371 (c)(1),
(2), (4) Date: Nov. 25, 2008

(87) PCT Pub. No.: WO2007/077867
PCT Pub. Date: Jul. 12, 2007

(65) Prior Publication Data
US 2009/0234552 A1    Sep. 17, 2009

(30) Foreign Application Priority Data

Dec. 28, 2005 (JP) .................. 2005-378929
Mar. 31, 2006 (JP) .................. 2006-101053

(51) Int. Cl.
*B60W 40/08* (2006.01)
*B60W 10/04* (2006.01)
*B60W 30/16* (2006.01)

(52) U.S. Cl. .................... 701/93; 701/96; 701/70
(58) Field of Classification Search .............. None
See application file for complete search history.

(56) References Cited

U.S. PATENT DOCUMENTS 5,670,953 A * 9/1997 Satoh et al. .................. 340/903
(Continued)

FOREIGN PATENT DOCUMENTS

EP      1 544 071 A1    6/2005
(Continued)

OTHER PUBLICATIONS

Ozawa, Koji et al., Modeling of Individualities . . . Electronics, Information and Communication Engineers Technical Report, vol. 104, No. 581, Jan. 15, 2005, pp. 17-24.

*Primary Examiner* — Michael J. Zanelli
(74) *Attorney, Agent, or Firm* — Bacon & Thomas, PLLC

(57) ABSTRACT

A driver model with higher precision is created as an evaluation standard for a driving condition in a normal condition. By detecting biometric information of a driver, whether a driver is in a usual condition or not is recognized. Then, data of driving conditions are collected while the driver is driving, and from the driving condition data, a part indicating that the driver operates in a usual condition is extracted to create a driver model. Further, the driver model is created taking only a case of driving in a normal condition as a driving action in normal times based on biometric information of the driver, and hence the driver model becomes more precise and neutral. Further, by using a GMM (Gaussian mixture model) for the driver model, a driver model for each driver can be created easily, and moreover, by calculation to maximize a conditional probability, a driving operation action is easily estimated and outputted.

10 Claims, 33 Drawing Sheets

U.S. PATENT DOCUMENTS

| | | | |
|---|---|---|---|
| 7,720,586 B2 * | 5/2010 | Harumoto et al. | 701/48 |
| 7,974,748 B2 * | 7/2011 | Goerick et al. | 701/28 |
| 2005/0131588 A1 * | 6/2005 | Kuge et al. | 701/1 |

FOREIGN PATENT DOCUMENTS

| | | |
|---|---|---|
| JP | 08-132931 | 5/1996 |
| JP | 11-099848 | 4/1999 |
| JP | 11-099849 | 4/1999 |
| JP | 2000-020898 | 1/2000 |
| JP | 2002-140786 | 5/2002 |
| JP | 2002-157673 | 5/2002 |
| JP | 2002-331850 | 11/2002 |
| JP | 2004-114954 | 4/2004 |
| JP | 2005-092285 | 4/2005 |
| JP | 2005-125819 | 5/2005 |
| JP | 2005-178628 | 7/2005 |

* cited by examiner

FIG. 1
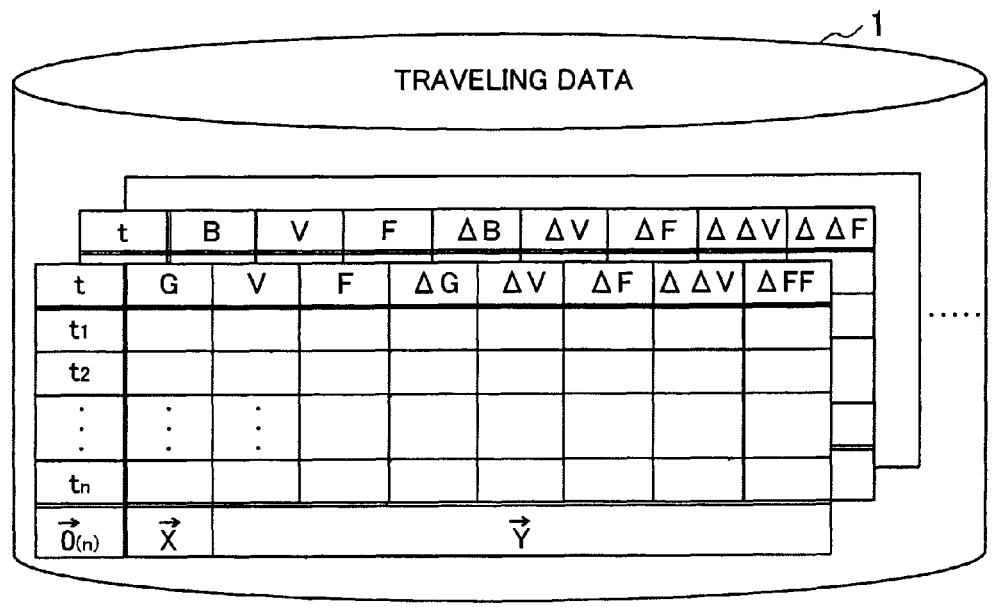
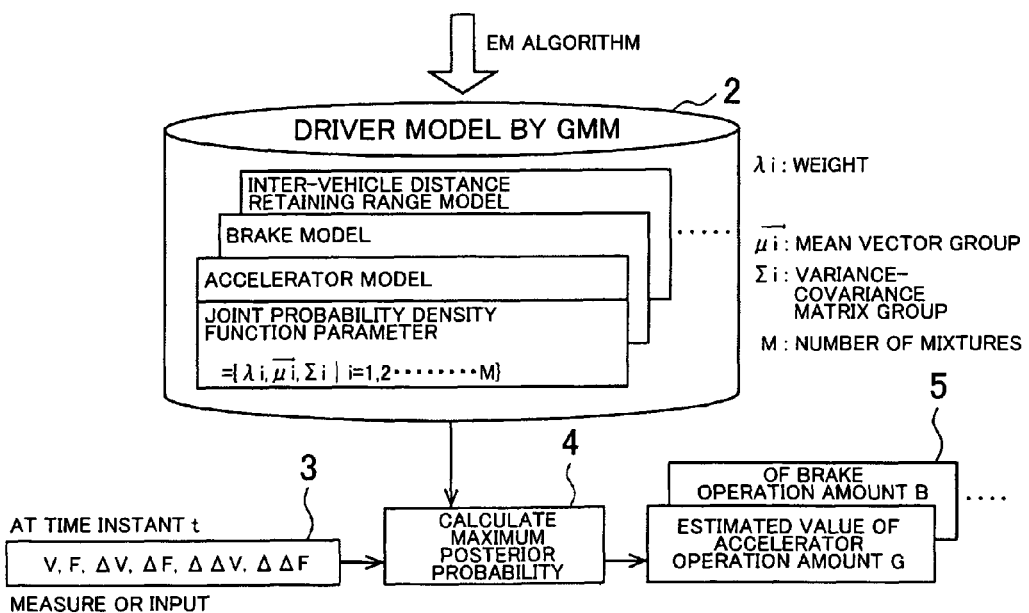

FIG. 4A

TRAVELING ENVIRONMENT DATA

| No | ITEM |
|---|---|
| 1 | TRAVELING CONDITION DATA |
| 2 | ROAD CONDITION DATA |

| No | ITEM |
|---|---|
| 1 | VEHICLE SPEED |
| 2 | INTER-VEHICLE DISTANCE |
| 3 | WEATHER |
| 4 | PRESENCE OF TRAFFIC JAM |
| 5 | BRIGHTNESS |
| 6 | . . . |

| No | ITEM |
|---|---|
| 1 | ROAD TYPE |
| 2 | PAVEMENT FORM |
| 3 | ROAD WIDTH |
| 4 | NUMBER OF LANES |
| 5 | FRICTION COEFFICIENT |
| 6 | IRREGULARITY COEFFICIENT |
| 7 | BEND CURVATURE |
| 8 | CANT |
| 9 | GRADIENT |
| 10 | VISIBILITY |
| 11 | . . . |

FIG. 4B

DRIVER OPERATION DATA

| No | ITEM |
|---|---|
| 1 | STEERING WHEEL OPERATION AMOUNT |
| 2 | ACCELERATOR PEDAL OPERATION AMOUNT |
| 3 | BRAKE PEDAL OPERATION AMOUNT |
| ⋮ | ⋮ |

FIG. 12A  TRAVELING PERFORMANCE DATA

| No | ITEM |
|---|---|
| 1 | VEHICLE WEIGHT |
| 2 | ENGINE PERFORMANCE |
| 3 | BRAKE PERFORMANCE |
| 4 | GEAR RATIO |
| 5 | SUSPENSION SPRING CONSTANT |
| 6 | ... |

FIG. 12B  DATA FOR EXECUTING SIMULATION

| No | LARGE ITEM |
|---|---|
| 1 | TRAVELING CONDITION DATA |

| No | ITEM |
|---|---|
| 1 | VEHICLE SPEED |
| 2 | INTER-VEHICLE DISTANCE |
| 3 | WEATHER |
| 4 | PRESENCE OF TRAFFIC JAM |
| 5 | ... |

FIG. 12C  TRAVELING ROUTE MODEL

| No | ITEM |
|---|---|
| 1 | CLEAR SKY, ASPHALT ROAD |
| 2 | STONE-PAVED ROAD |
| 3 | WAVE-FORM ROAD |
| 4 | STEEP INCLINED ROAD |
| 5 | FLOODED ROAD |
| 6 | DIRT ROAD |
| 7 | ... |

| No | ITEM |
|---|---|
| 1 | PAVEMENT FORM |
| 2 | ROAD WIDTH |
| 3 | NUMBER OF LANES |
| 4 | FRICTION COEFFICIENT |
| 5 | IRREGULARITY COEFFICIENT |
| 6 | BEND CURVATURE |
| 7 | CANT |
| 8 | GRADIENT |
| 9 | ... |

FIG. 12D  VEHICLE TRAVEL ESTIMATION DATA

| No | ITEM |
|---|---|
| 1 | OWN VEHICLE SPEED |
| 2 | INTER-VEHICLE DISTANCE |
| 3 | BARYCENTRIC POSITION |
| 4 | TIRE ANGLE |
| 5 | YAW RATE |
| 6 | PITCH RATE |
| 7 | ... |

FIG. 12E  TRAVELING EVALUATION DATA

| No | ITEM | EXAMPLE |
|---|---|---|
| 1 | ACCELERATION PERFORMANCE | ACCELERATION CURVE WITH RESPECT TO ACCELERATOR OPENING DEGREE |
| 2 | DECELERATION PERFORMANCE | DECELERATION CURVE WITH RESPECT TO BRAKE OPERATION AMOUNT |
| 3 | STEERING PERFORMANCE | TRAVEL CURVE WITH RESPECT TO STEERING WHEEL OPERATION AMOUNT |
| 4 | STABLE TRAVELING PERFORMANCE | TRAVEL TRACE WITH RESPECT TO ROAD DIRECTION |
| 5 | ... | ... |

VEHICLE SPEED OF PRECEDING VEHICLE

RECORDED DATA
(LEARNING DATA)

VEHICLE SPEED OF PRECEDING VEHICLE

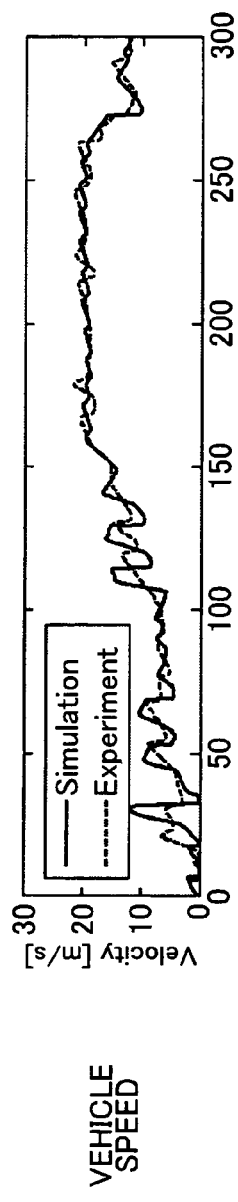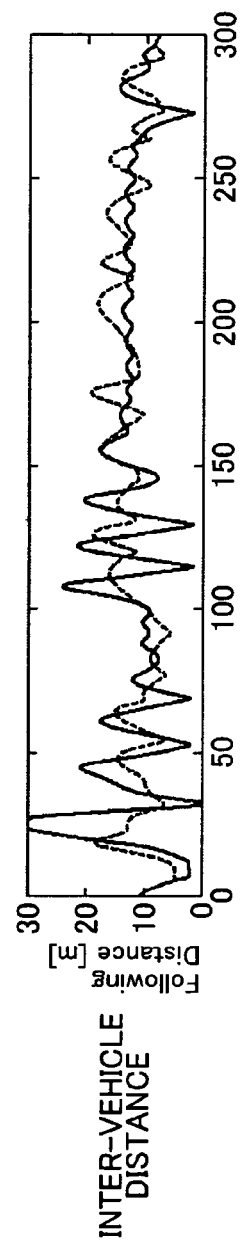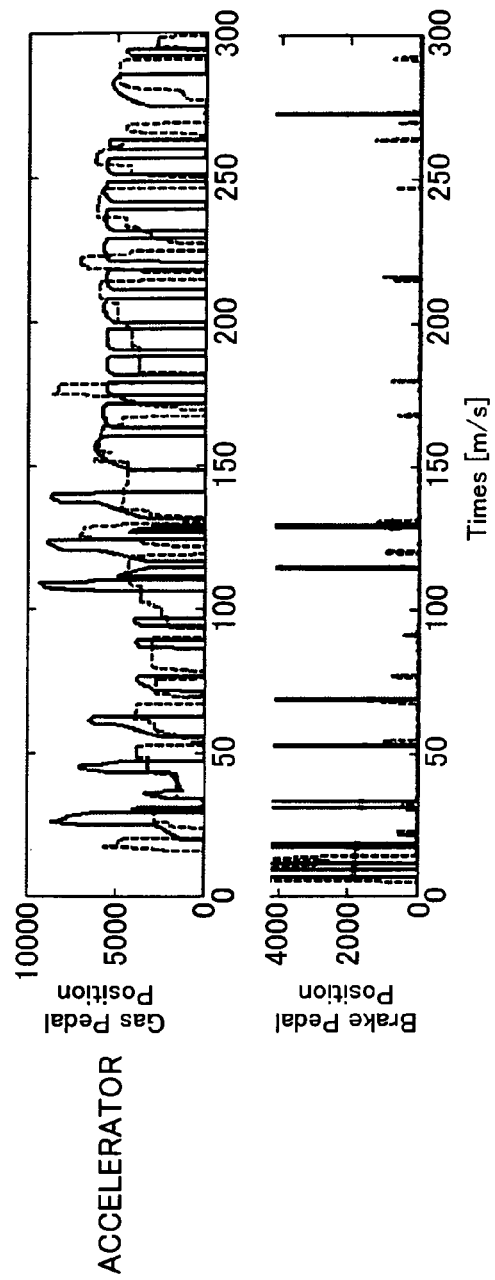
F I G. 15A  VEHICLE SPEED
F I G. 15B  INTER-VEHICLE DISTANCE
F I G. 15C  ACCELERATOR

FIG. 17

OWN VEHICLE INFORMATION OBTAINING UNIT DATA

| No | LARGE ITEM | SMALL ITEM | DATA NAME | DATA FORM |
|---|---|---|---|---|
| 1 | DRIVER DRIVING OPERATION AMOUNT | STEERING WHEEL OPERATION AMOUNT | STEERING WHEEL OPERATION AMOUNT [deg] | ACTUAL MEASURED VALUE |
| 2 | | ACCELERATOR OPERATION AMOUNT | ACCELERATOR OPERATION AMOUNT [mm] | ACTUAL MEASURED VALUE |
| 3 | | BRAKE OPERATION AMOUNT | BRAKE OPERATION AMOUNT [mm] | ACTUAL MEASURED VALUE |
| 4 | SPEED | SPEED | SPEED [km/h] | ACTUAL MEASURED VALUE |
| 5 | ACCELERATION | YAW AXIS ACCELERATION | YAW AXIS ACCELERATION [m/s2] | ACTUAL MEASURED VALUE |
| 6 | | PITCH AXIS ACCELERATION | PITCH AXIS ACCELERATION [m/s2] | ACTUAL MEASURED VALUE |
| 7 | | ROLL AXIS ACCELERATION | ROLL AXIS ACCELERATION [m/s2] | ACTUAL MEASURED VALUE |
| 8 | TIMER | DRIVING TIME PERIOD | DRIVING TIME PERIOD [min] | ACTUAL MEASURED VALUE |
| 9 | ELECTRICAL OPERATION STATUS | BLINKER OPERATION STATUS | NO BLINK | FLAG |
| 10 | | | LEFT | FLAG |
| 11 | | | RIGHT | FLAG |
| 12 | | | HAZARD | FLAG |
| 13 | | LIGHT OPERATION STATUS | LIGHT OFF | FLAG |
| 14 | | | HIGH BEAM | FLAG |
| 15 | | | LOW BEAM | FLAG |
| 16 | | | FOG LAMP | FLAG |
| 17 | | | etc. | FLAG |
| 18 | | WIPER OPERATION STATUS | WASHING | FLAG |
| 19 | | | WIPER OFF | FLAG |
| 20 | | | INTERMITTENT | FLAG |
| 21 | | | WEAK | FLAG |
| 22 | | | STRONG | FLAG |
| 23 | | etc. | etc. | FLAG |

FIG. 18

OWN VEHICLE SURROUNDING ENVIRONMENT INFORMATION OBTAINING UNIT _ VEHICLE SURROUNDING INFORMATION OBTAINING UNIT DATA

| No | LARGE ITEM | SMALL ITEM | DATA NAME | DATA FORM |
|---|---|---|---|---|
| 1 | VEHICLE | VEHICLE TYPE | PASSENGER CAR | FLAG |
| 2 | | | MOTORCYCLE | FLAG |
| 3 | | | BICYCLE | FLAG |
| 4 | | | TRUCK | FLAG |
| 5 | | | etc. | FLAG |
| 6 | | INTER-VEHICLE DISTANCE | INTER-VEHICLE DISTANCE [m] | ACTUAL MEASURED VALUE |
| 7 | | RELATIVE SPEED | RELATIVE SPEED [km/h] | ACTUAL MEASURED VALUE |
| 8 | | ATTRIBUTE | ONCOMING VEHICLE | - |
| 9 | | | VEHICLE TRAVELING IN PARALLEL | - |
| 10 | | | CROSSING VEHICLE (FROM LEFT) | - |
| 11 | | | CROSSING VEHICLE (FROM RIGHT) | - |
| 12 | PEDESTRIAN | TYPE | ADULT | FLAG |
| 13 | | | CHILD | FLAG |
| 14 | | | AGED PERSON | FLAG |
| 15 | | | PERSON WITH PET | FLAG |
| 16 | | | COUPLE | FLAG |
| 17 | | | etc. | FLAG |
| 18 | | MOVING DIRECTION | ONCOMING | FLAG |
| 19 | | | SAME DIRECTION | FLAG |
| 20 | | | CROSSING (RIGHTWARD) | FLAG |
| 21 | | | CROSSING (LEFTWARD) | FLAG |
| 22 | | | etc. | FLAG |
| 23 | | STATUS | HALT | FLAG |
| 24 | | | ORDINARY WALKING | FLAG |
| 25 | | | ORDINARY RUNNING | FLAG |
| 26 | | | MOVING WHILE STARING AT CELL PHONE | FLAG |
| 27 | | | etc. | FLAG |
| 28 | OBSTACLE | TYPE | STRUCTURE (FIXED OBJECT SUCH AS FENCE, ELECTRIC POLE OR THE LIKE) | FLAG |
| 29 | | | CONSTRUCTION SITE | FLAG |
| 30 | | | SIDE DITCH | FLAG |
| 31 | | | etc. | FLAG |
| 32 | | POSITION | LEFT ROAD SHOULDER | - |
| 33 | | | RIGHT ROAD SHOULDER | - |
| 34 | | | CENTER OF ROAD | - |
| 35 | | | OVERHEAD | - |
| 36 | | | etc. | - |
| 37 | | | | - |

FIG. 19

| No | LARGE ITEM | SMALL ITEM | DATA NAME | DATA FORM |
|---|---|---|---|---|
| | | OWN VEHICLE SURROUNDING ENVIRONMENT INFORMATION OBTAINING UNIT | ROAD INFORMATION OBTAINING UNIT DATA | |
| 1 | ROAD TYPE | NARROW ROAD | ONE WAY TRAFFIC | FLAG |
| 2 | | | BOTH WAY TRAFFIC | FLAG |
| 3 | | OPEN ROAD | ONE WAY TRAFFIC | FLAG |
| 4 | | | BOTH WAY TRAFFIC | FLAG |
| 5 | | | TWO LANES ON ONE SIDE | FLAG |
| 6 | | | etc. | FLAG |
| 7 | | HIGHWAY | " | FLAG |
| 8 | | EXPRESSWAY | " | FLAG |
| 9 | | etc. | " | FLAG |
| 10 | ROAD FORM | STRAIGHTWAY | LEVEL GROUND | FLAG |
| 11 | | | ASCENDING SLOPE | FLAG |
| 12 | | | DESCENDING SLOPE [°] | FLAG |
| 13 | | | ANGLE OF SLOPE | ACTUAL MEASURED VALUE |
| 14 | | CURVE | RADIUS OF CURVATURE [m] | ACTUAL MEASURED VALUE |
| 15 | | INTERSECTION | PEDESTRIAN CROSSWALK ONLY, NO TRAFFIC LIGHT | FLAG |
| 16 | | | PEDESTRIAN CROSSWALK ONLY, THERE IS TRAFFIC LIGHT | FLAG |
| 17 | | | etc. | FLAG |
| 18 | | BRANCH | BRANCH FROM RIGHT | FLAG |
| 19 | | | BRANCH FROM LEFT | FLAG |
| 20 | | MERGE | " | FLAG |
| 21 | | TUNNEL | TUNNEL | FLAG |
| 22 | | etc. | etc. | FLAG |
| 23 | ROAD WIDTH | ROAD WIDTH, LANE WIDTH | NARROW (2.5 m OR SMALLER) | FLAG |
| 24 | | | ORDINARY (3.5 m TO 2.5 m) | FLAG |
| 25 | | | WIDE (3.5 m OR LARGER) | FLAG |
| 26 | OWN VEHICLE POSITION | ROAD SHOULDER | ROAD SHOULDER | FLAG |
| 27 | | TRAVELING LANE | FIRST LANE FROM LEFT | FLAG |
| 28 | | | SECOND LANE FROM LEFT | FLAG |
| 29 | | | TRAVELING IN REVERSE DIRECTION | FLAG |
| 30 | | etc. | etc. | FLAG |
| 31 | ROAD SURFACE CONDITION | DRY | DRY | FLAG |
| 32 | | WET | WET | FLAG |
| 33 | | RAINFALL | RAINFALL | FLAG |
| 34 | | SNOW COVER | SNOW COVER | FLAG |
| 35 | | ICY | ICY | FLAG |
| 36 | | UNPAVED | UNPAVED | FLAG |
| 37 | | etc. | etc. | FLAG |
| 38 | ROAD BRIGHTNESS | ORDINARY | ORDINARY | FLAG |
| 39 | | GLARING | GLARING | FLAG |
| 40 | | DARK | DARK | FLAG |
| 41 | | etc. | etc. | FLAG |
| 42 | TRAFFIC LIGHT | RED | RED | FLAG |
| 43 | | GREEN | GREEN | FLAG |
| 44 | | etc. | etc. | FLAG |
| 45 | ROAD ATTRIBUTE (TRAFFIC REGULATION) | REGULATORY SIGN | etc. | FLAG |
| 46 | | INSTRUCTION SIGN | etc. | FLAG |
| 47 | | WARNING SIGN | etc. | FLAG |
| 48 | | GUIDE SIGN | etc. | FLAG |
| 49 | | AUXILIARY SIGN | etc. | FLAG |
| 50 | | RESTRICTION INDICATION | etc. | FLAG |
| 51 | | INSTRUCTION INDICATION | etc. | FLAG |
| 52 | OTHERS | ROAD VISIBILITY | etc. | FLAG |
| 53 | | DEGREE OF CONGESTION OF ROAD | etc. | FLAG |
| 54 | | etc. | etc. | FLAG |

F I G . 20

OWN VEHICLE SURROUNDING ENVIRONMENT INFORMATION OBTAINING UNIT − NETWORK DATA

| No | LARGE ITEM | MEDIUM ITEM | SMALL ITEM | DATA FORM |
|---|---|---|---|---|
| 1 | VICS OR THE LIKE TRAFFIC INFORMATION NETWORK | TRAFFIC JAM INFORMATION | TRAFFIC JAM [km] | ACTUAL MEASURED VALUE |
| 2 | | | CONGESTION [km] | ACTUAL MEASURED VALUE |
| 3 | | | ACCIDENT | FLAG |
| 4 | | | ROAD CLOSURE | FLAG |
| 5 | | | CHAIN RESTRICTION | FLAG |
| 6 | | | etc. | FLAG |
| 7 | WEATHER INFORMATION | WEATHER FORECAST | CLEAR | etc. |
| | | | CLOUDY | FLAG |
| | | | RAIN | FLAG |
| | | | SNOW | FLAG |
| | | | etc. | etc. |
| 8 | | | RAINFALL PROBABILITY | ACTUAL MEASURED VALUE |
| 9 | | | AIR TEMPERATURE | ACTUAL MEASURED VALUE |
| 10 | | | etc. | etc. |
| 11 | etc. | etc. | etc. | etc. |

FIG. 21

DRIVER BIOMETRIC INFORMATION OBTAINING UNIT DATA

| No | LARGE ITEM | DATA NAME | DATA FORM |
|---|---|---|---|
| 1 | ELECTROCARDIOGRAPH | ELECTROCARDIOGRAPH WAVEFORM | ACTUAL MEASURED VALUE |
| 2 | | R-R INTERVAL [msec] | ACTUAL MEASURED VALUE |
| 3 | | etc. | ACTUAL MEASURED VALUE |
| 4 | HEART RATE METER | HEARTBEAT [bpm] | ACTUAL MEASURED VALUE |
| 5 | RESPIROMETER | RESPIRATION | ACTUAL MEASURED VALUE |
| 6 | CLINICAL THERMOMETER | BODY TEMPERATURE [°C] | ACTUAL MEASURED VALUE |
| 7 | BLOOD-PRESSURE METER | BLOOD PRESSURE [mmHg] | ACTUAL MEASURED VALUE |
| 8 | SKIN POTENTIAL METER | SKIN POTENTIAL [mV] | ACTUAL MEASURED VALUE |
| 9 | SUDOROMETER | AMOUNT OF WATER LOSS [mg/cm2·min] | ACTUAL MEASURED VALUE |
| 10 | ELECTROMYOGRAPH | ELECTROMYOGRAM WAVEFORM | ACTUAL MEASURED VALUE |
| 11 | ELECTRO-ENCEPHALOGRAPH | ELECTROENCEPHALOGRAPH | ACTUAL MEASURED VALUE |
| 12 | etc. | etc. | ACTUAL MEASURED VALUE |

FIG. 22

INFORMATION PROVIDING UNIT DATA

| No | LARGE ITEM | SMALL ITEM | DATA NAME | DATA FORM |
|---|---|---|---|---|
| 1 | VOICE OUTPUT | WARNING VOICE | WARNING VOICE | VOICE DATA |
| 2 | SCREEN OUTPUT | WARNING SCREEN | WARNING SCREEN | SCREEN DISPLAY DATA |
| 3 | CORRECTION OPERATION ASSIST | STEERING WHEEL OPERATION | STEERING WHEEL OPERATION ASSIST | ASSIST TORQUE SET VALUE |
| 4 | | ACCELERATOR OPERATION | ACCELERATOR OPERATION ASSIST | ASSIST TORQUE SET VALUE |
| 5 | | BRAKE OPERATION | BRAKE OPERATION ASSIST | ASSIST TORQUE SET VALUE |

FIG. 24

SITUATION TABLE 163

| No. | LARGE ITEM | MEDIUM ITEM (1) | MEDIUM ITEM (2) | SMALL ITEM (1) | DATA NAME | SITUATION a | SITUATION b | SITUATION c | etc. |
|---|---|---|---|---|---|---|---|---|---|
| 26 | PEDESTRIAN POSITION | TRAVELING DIRECTION PERSON | LEFT ROAD SHOULDER | TYPE | NORMAL | ○ | | | |
| 27 | | | | | CHILD | | | ○ | |
| 28 | | | | | AGED PERSON | | ○ | | |
| 29 | | | | | PERSON WITH PET | | | ○ | |
| 30 | | | | | COUPLE | | | | |
| 31 | | | | | etc. | | | | |
| 32 | | | | MOVING DIRECTION (DIRECTION OF BODY) | SAME DIRECTION | ○ | | | |
| 33 | | | | | OPPOSING | | | | |
| 34 | | | | | RIGHTWARD | | | ○ | |
| 35 | | | | | LEFTWARD | | ○ | | |
| 36 | | | | STATE | HALT | | ○ | | |
| 37 | | | | | ORDINARY WALKING | | | ○ | |
| 38 | | | | | ORDINARY RUNNING | ○ | | | |
| 39 | | | | | MOVING WHILE STARING AT CELL PHONE | | | | |
| 40 | | | | | etc. | | | | |

STABLE CASE

UNSTABLE CASE

LORENZ PLOT ANALYSIS OF ELECTROCARDIOGRAM

FIG. 28

| | SYMPATHETIC NERVOUS SYSTEM | PARASYMPATHETIC NERVOUS SYSTEM |
|---|---|---|
| EFFECT | MENTALLY TENSE STATE | MENTALLY RELAXED STATE (≒INATTENTIVE) |
| HEART RATE | INCREASED | DECREASED |
| SYSTOLIC FORCE | INCREASED | --- |
| BLOOD VESSEL | CONTRACTED | EXPANDED |
| BLOOD PRESSURE | INCREASED | DECREASED |
| PUPIL | DILATED | CONTRACTED |
| DIGESTION (GASTROINTESTINAL) ACTIVITY | SUPPRESSED | INCREASED |
| SALIVATION | SUPPRESSED | INCREASED |
| METABOLIC RATE | INCREASED | DECREASED |

| SYMPATHETIC NERVOUS SYSTEM DOMINANT | EXTREME TENSION (POSSIBLY LOW ATTENTIVENESS) | MODERATE TENSION (HIGH ATTENTIVENESS) | RELAXED STATE (LOW ATTENTIVENESS) | RELAXED STATE (VERY LOW ATTENTIVENESS) | PARASYMPATHETIC NERVOUS SYSTEM DOMINANT |

FIG. 31A

CURRENT SITUATION

| DATA NAME | FLAG |
|---|---|
| NORMAL | |
| CHILD | |
| AGED PERSON | O |
| PERSON WITH PET | |
| COUPLE | |
| etc. | |
| SAME DIRECTION | |
| OPPOSING | |
| RIGHTWARD | O |
| LEFTWARD | |
| HALT | O |
| ORDINARY WALKING | |
| ORDINARY RUNNING | |
| MOVING WHILE STARING AT CELL PHONE | |
| etc. | ... |

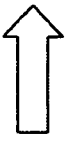

FLAG PATTERN MATCHING

FIG. 31B

SITUATION TABLE ~163

| DATA NAME | SITUATION a | SITUATION b | SITUATION c | etc. |
|---|---|---|---|---|
| NORMAL | O | | | |
| CHILD | | | O | |
| AGED PERSON | | O | | |
| PERSON WITH PET | | | O | |
| COUPLE | | | | |
| etc. | | | | |
| SAME DIRECTION | O | | | |
| OPPOSING | | | O | |
| RIGHTWARD | | O | | |
| LEFTWARD | | O | | |
| HALT | | | O | |
| ORDINARY WALKING | O | | | |
| ORDINARY RUNNING | | | | |
| MOVING WHILE STARING AT CELL PHONE | | | | |
| etc. | ... | | | |

CONFORM

F I G. 32A
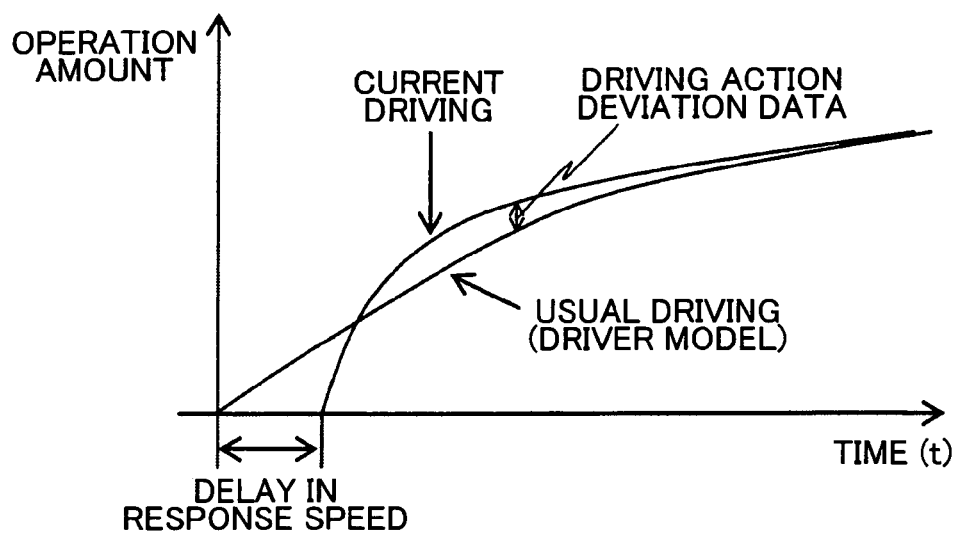
F I G. 32B
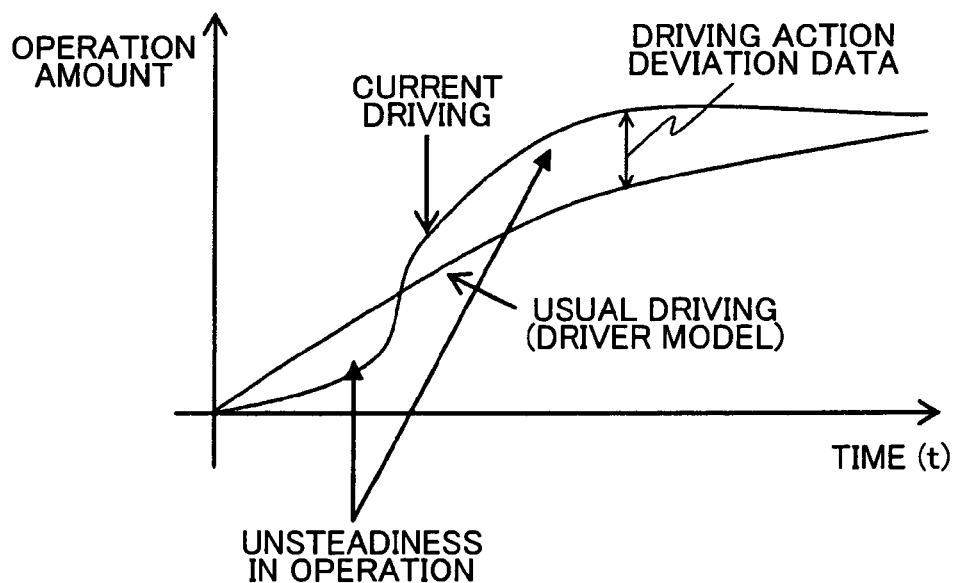

FIG. 33

```
DRIVER BIOMETRIC INFORMATION
MONITORING PROCESSING
            │
   S141     │
   ┌────────┴────────┐
   │ COLLECT DRIVER  │
   │ BIOMETRIC       │
   │ INFORMATION     │
   └────────┬────────┘
   S142     │
   ┌────────┴────────┐
   │ DETERMINE AND   │
   │ OUTPUT DRIVER   │
   │ BIOMETRIC       │
   │ INFORMATION CASE│
   └────────┬────────┘
          RETURN
```

FIG. 34A

DRIVER'S EYE AND SLEEPINESS

| CONDITION OF DRIVER | NORMAL | SLEEPY |
|---|---|---|
| NUMBER OF BLINKS | NORMAL VALUE | DECREASED |
| BLINK TIME | NORMAL VALUE | INCREASED |
| OPENING DEGREE OF EYELID | NORMAL VALUE | DECREASED |
| MOVEMENT OF SIGHT LINE | NORMAL VALUE | DECREASED |

FIG. 34B

DRIVER'S EYE AND FATIGUE

| CONDITION OF DRIVER | NORMAL | FATIGUED |
|---|---|---|
| NUMBER OF BLINKS | NORMAL VALUE | INCREASED |
| MOVEMENT OF EYELID | NORMAL VALUE | TWITCHING |
| OTHERS | – | RUBBING EYE |
|  | – | MASSAGING PART BETWEEN EYES |

FIG. 36A APPROACH OF SYSTEM BY DRIVER CONDITION (ESTIMATED DRIVER'S CONDITION)

| | BIOMETRIC INFORMATION CASE | | | | |
|---|---|---|---|---|---|
| DRIVING ACTION \ | EXTREMELY TENSE CONDITION | MODERATELY TENSE CONDITION | INATTENTIVE CONDITION | RELAXED CONDITION | SLEEPY CONDITION |
| RESPONSE DELAY | DISTRACTED BY SOMETHING | DISTRACTED BY SOMETHING | GETTING TIRED | DRIVING CARELESSLY | SLEEPY |
| UNSTEADINESS | IMPATIENCE | LOOKING AWAY | DRIVING CARELESSLY | DRIVING CARELESSLY | SLEEPY |
| RESPONSE DELAY + UNSTEADINESS | NOT CONCENTRATING ON DRIVING | CONCENTRATING ON OTHER THAN DRIVING | FEELING HARD TO DRIVE | DRIVING CARELESSLY | VERY SLEEPY |
| NONE | IMPATIENCE, ANGER, PANIC, OR THE LIKE | NONE (NORMAL) | WEARY OF DRIVING | NOT CONCENTRATING ON DRIVING | SLIGHTLY SLEEPY |

⇩

FIG. 36B APPROACH OF SYSTEM BY DRIVER CONDITION (APPROACH)

| | BIOMETRIC INFORMATION CASE | | | | |
|---|---|---|---|---|---|
| DRIVING ACTION \ | EXTREMELY TENSE CONDITION | MODERATELY TENSE CONDITION | INATTENTIVE CONDITION | RELAXED CONDITION | SLEEPY CONDITION |
| RESPONSE DELAY | ALERTING (VOICE, VIBRATION, OR THE LIKE) | ALERTING (VOICE, VIBRATION, OR THE LIKE) | SUGGEST TO TAKE BREAK (PROVIDE FACILITY INFORMATION) | ALERTING + α1 | SLEEPY |
| EXTREMELY TENSE CONDITION | ALERTING (VOICE, VIBRATION, OR THE LIKE) | ALERTING (VOICE, VIBRATION, OR THE LIKE) | PROVIDE INFORMATION TO DIVERT MOOD | ALERTING + α1 | SLEEPY |
| RESPONSE DELAY + UNSTEADINESS | ALERTING + α1 | ALERTING + α1 | ALERTING + α2 | ALERTING + α1 | ALERTING + α3 |
| NONE | BEWARE OF DRIVING MISTAKE | NONE | BEWARE OF WHETHER DRIVER ACCUMULATES FATIGUE | ALERTING (VOICE, VIBRATION, OR THE LIKE) | BEWARE OF WHETHER DRIVER ACCUMULATES SLEEPINESS | ns
DRIVING ACTION ESTIMATING DEVICE, DRIVING SUPPORT DEVICE, VEHICLE EVALUATING SYSTEM, DRIVER MODEL CREATING DEVICE, AND DRIVING ACTION DETERMINING DEVICE

TECHNICAL FIELD

The present invention relates to a driving action estimating device, a driving support device, and a vehicle evaluating system, and relates to, for example, a device and a system for estimating a driving action, performing a driving support, and performing vehicle evaluation using a driver model, and a creating device for a driver model to be an evaluation standard for a driving condition, and a device for evaluating a driving condition and performing a driving support using the driver model.

BACKGROUND ART

Various proposals have been made regarding modeling a driving operation of a vehicle operator (driver) and application thereof.

For example, in a technology described in Patent Document 1, there is proposed a technology for evaluating the degree of hazard present at an intersection road by means of a driver model using fuzzy rules, a neural network, or the like.
[Patent Document 1] Japanese Patent Application Publication No. JP-A-2002-140786

DISCLOSURE OF THE INVENTION

Problems to be Solved by the Invention

In the technology described in Patent Document 1, since the driver model is formed using fuzzy rules, a neural network, or the like, creation of the fuzzy rules or learning of back propagation or the like is required, and hence the driver model cannot be created easily.

Further, in related arts, it is possible to create a model targeted at an ordinary driver, but it is difficult to more precisely represent characteristics of driving operation for each driver.

Accordingly, it is not possible to create a driver model representing characteristics of each of plural drivers.

Furthermore, the conventional driver model is for evaluating the hazard present at an intersection road, and is not a driver model for estimating a driving action of a driving operation.

Accordingly, a first object of the present invention is to estimate a driving action using a driver model which can be created easily and can represent driving characteristics of a driver more precisely.

Also, using a driver model as described in Patent Document 1, a driving condition of a driving operation or the like estimated from the driver model can be estimated as a normal driving condition, and this can be compared with a current driving condition, to thereby evaluate the current driving.

However, the driving condition estimated from the driver model is not always a normal driving condition for the driver.

Further, even when data of driving conditions are collected through actual driving of a vehicle by a certain driver and then a driver model is created in advance based on them, driving in a normal condition is not always performed.

Therefore, a second object of the present invention is to create a driver model with higher precision as an evaluation standard for a driving condition.

Further, a third object thereof is to provide a driving support device for evaluating a driving condition with higher precision and performing a driving support using the driver model.

Further, a fourth object thereof is to evaluate a driving condition with higher precision for a driving action of the driver.

Means for Solving the Problems (1) To achieve the above-described first object, a driving action estimating device is provided with: a driver model that describes, with time-series data of N types of characteristic amounts detected along with traveling of a vehicle being learning data, a probability distribution of existence of the respective data in N dimensional spaces; characteristic amount obtaining means for obtaining at least one or more characteristic amounts from the N types excluding a certain characteristic amount x; maximum posterior probability calculating means for calculating a maximum posterior probability in the driver model for the obtained characteristic amount; and output means for outputting an estimated value of the certain characteristic amount x for the obtained characteristic amount based on the calculated maximum posterior probability.

(2) The invention is characterized in that, in the driving action estimating device, the N types of characteristic amounts include a time change amount for n types (n<N) of characteristic amounts.

(3) The invention is characterized in that, in the driving action estimating device, the characteristic amount x includes an operation amount of an operation device operated directly by a driver and a time change amount of the operation amount.

(4) The invention is characterized in that, in the driving action estimating device, the driver model is described by a GMM (Gaussian mixture model) calculated by an EM algorithm, with time-series data of the N types of characteristics amounts being learning data, as a probability distribution of existence of the respective data.

(5) In the invention, a driving support device is provided with: a driving action estimating device, which uses a driver model for an accelerator and a driver model for a brake using an accelerator operation amount, a brake operation amount, a vehicle speed of an own vehicle, and an inter-vehicle distance from a front vehicle as characteristic amounts, and estimates an accelerator operation amount and a brake operation amount as the characteristic amounts x; traveling data obtaining means for obtaining a vehicle speed of an own vehicle and an inter-vehicle distance; traveling control means for performing automatic cruise control with respect to the front vehicle by controlling an engine throttle and a brake pedal according to an accelerator operation amount and a brake operation amount that are estimated with respect to the obtained traveling data by the driving action estimating device.

(6) In the invention, a vehicle evaluating system is provided with: a driving action estimating device, which uses a driver model for an accelerator and a driver model for a brake using an accelerator operation amount, a brake operation amount, a vehicle speed of an own vehicle, and an inter-vehicle distance from a front vehicle as characteristic amounts, and estimates an accelerator operation amount and a brake operation amount as the characteristic amounts x; means for obtaining vehicle performance data of a vehicle as a target of evaluation; means for obtaining traveling data and a traveling route model for simulation; vehicle dynamics calculating means for estimating a behavior of a vehicle including acceleration of the vehicle as a target of evaluation with respect to an accelerator operation amount and a brake operation amount that are obtained by applying the obtained traveling data and traveling route model to the driving action estimating device; and evaluating means for evaluating traveling performance of the vehicle as a target of evaluation from the estimated behavior of the vehicle.

(7) To achieve the above-described second object, in the invention, a driver model creating device is provided with: condition determining means for determining a condition of a driver; driving operation information obtaining means for obtaining driving operation information in vehicle traveling; and driver model creating means for creating a driver model of a driving operation according to a condition of the driver based on the obtained driving operation information.

(8) The invention is characterized in that, in the driver model creating device, the condition determining means determines at least whether the condition of the driver is normal or not.

(9) The invention is characterized in that, in the driver model creating device, traveling environment obtaining means for detecting a certain traveling environment, wherein the driving operation information is stored for each of traveling environments, and wherein the driver model creating means creates a driver model for each of the traveling environments.

(10) The invention is characterized in that, in the driver model creating device, it includes biometric information obtaining means for obtaining biometric information of the driver, wherein the condition determining means determines the condition of the driver based on the obtained biometric information.

(11) To achieve the third object, in the invention, a driving support device is provided with: driver model obtaining means for obtaining a driver model of a driving operation in a normal condition; driving operation estimating means for estimating a driving operation which is usually operated in a normal condition using the obtained driver model; driving action determining means for determining a driving action of a driver from the estimated driving operation and a driving operation based on current driving operation information; and driving support means for performing a driving support according to the determined driving action.

(12) The invention is characterized in that, in the driving support device, the driver model obtaining means obtains a driver model corresponding to a current traveling environment from driver models of driving operations in a normal condition created for each traveling environment.

(13) The invention is characterized in that, in the driving support device, it includes driver condition determining means for determining a condition of a driver from biometric information of the driver, wherein the driving support means performs a driving support according to the determined driving action and the determined driver condition.

(14) The invention is characterized in that, in the driving support device, the driving support means performs at least one or more driving supports from among warning by voice or image, providing information, vibration, and guidance to a rest station according to determined content.

(15) To achieve the fourth object, in the invention, a driving action determining device is provided with: driver model obtaining means for obtaining a driver model of a driving operation in a normal condition; driving operation estimating means for estimating a driving operation which is usually operated in a normal condition using the obtained driver model; and driving action determining means for determining a driving action of a driver from the estimated driving operation and a driving operation based on current driving operation information.

Effects of the Invention

In the invention, a driver model that describes, with time-series data of N types of characteristic amounts detected along with traveling of a vehicle being learning data, a probability distribution of existence of the respective data in N dimensional spaces is used, and a maximum posterior probability in the driver model for the characteristic amount excluding a certain characteristic amount x is calculated and outputted as an estimated value of the certain characteristic amount x. Therefore, a driver model can be created easily, and a driving action that is closer to the driving characteristic of the driver can be estimated.

In the present invention, a driver model of a driving operation according to the condition of the driver is created, and therefore a driver model with higher precision can be obtained.

In the present invention, a driving action of a driver is determined from a driving operation, which is usually operated in a normal condition, estimated using a driver model of a driving operation in a normal condition and a driving operation based on current driving operation information, and a driving support is performed according to the determined driving action. Therefore, evaluation of a driving condition and a driving support with higher precision can be performed.

In the invention, a driving action of a driver is determined from a driving operation, which is usually operated in a normal condition, estimated using a driver model of a driving operation in a normal condition and a driving operation based on current driving operation information, and therefore evaluation of a driving condition with higher precision can be performed.

BRIEF DESCRIPTION OF THE DRAWINGS

FIG. 1 is an explanatory diagram representing principles related to generation of driver models by a driving action estimating device in a first embodiment and to estimation of driving actions based on the generated driver models;

FIG. 4 shows explanatory tables representing traveling data obtained by a traveling data obtaining unit;

FIG. 12 shows explanatory tables representing an overview of respective data in the driving action estimating device;

FIG. 15 shows explanatory graphs representing simulation results using the vehicle evaluating system;

FIG. 17 is an explanatory table exemplarily showing own vehicle information obtained in an own vehicle information obtaining unit;

FIG. 18 is an explanatory table exemplarily showing vehicle surrounding environment information obtained in a vehicle surrounding information obtaining unit;

FIG. 19 is an explanatory table exemplarily showing vehicle surrounding environment information obtained in the road information obtaining unit;

FIG. 20 is an explanatory table exemplarily showing vehicle surrounding environment information obtained in a network unit;

FIG. 21 is an explanatory table exemplarily showing biometric information obtained in a biometric information obtaining unit;

FIG. 22 is an explanatory table exemplarily showing information provided by an information providing unit and contents of assist;

FIG. 24 is an explanatory table conceptually representing contents of situation data;

FIG. 28 is an explanatory table representing a case of determining whether being in a normal condition or not from obtained biometric information;

FIG. 31 shows explanatory tables related to setting of a situation flag from own vehicle information and own vehicle surrounding environment information, and searching for a conforming situation;

FIG. 32 shows explanatory graphs conceptually comparing an estimated value of a driving operation amount in a normal condition (usual driving) outputted from a driver model output unit with an operation amount (own vehicle information) of current driving;

FIG. 33 is a flowchart related to monitoring processing of biometric information of a driver while traveling;

FIG. 34 shows explanatory tables in the case of determining a normal condition and sleepy, fatigued conditions from the condition of an eye of a driver;

FIG. 36 shows explanatory tables representing conditions of a driver estimated from the obtained driving action and biometric information case, and the contents of driving support performed corresponding to the estimated condition of the driver.

BEST MODES FOR CARRYING OUT THE INVENTION

Figure 2:
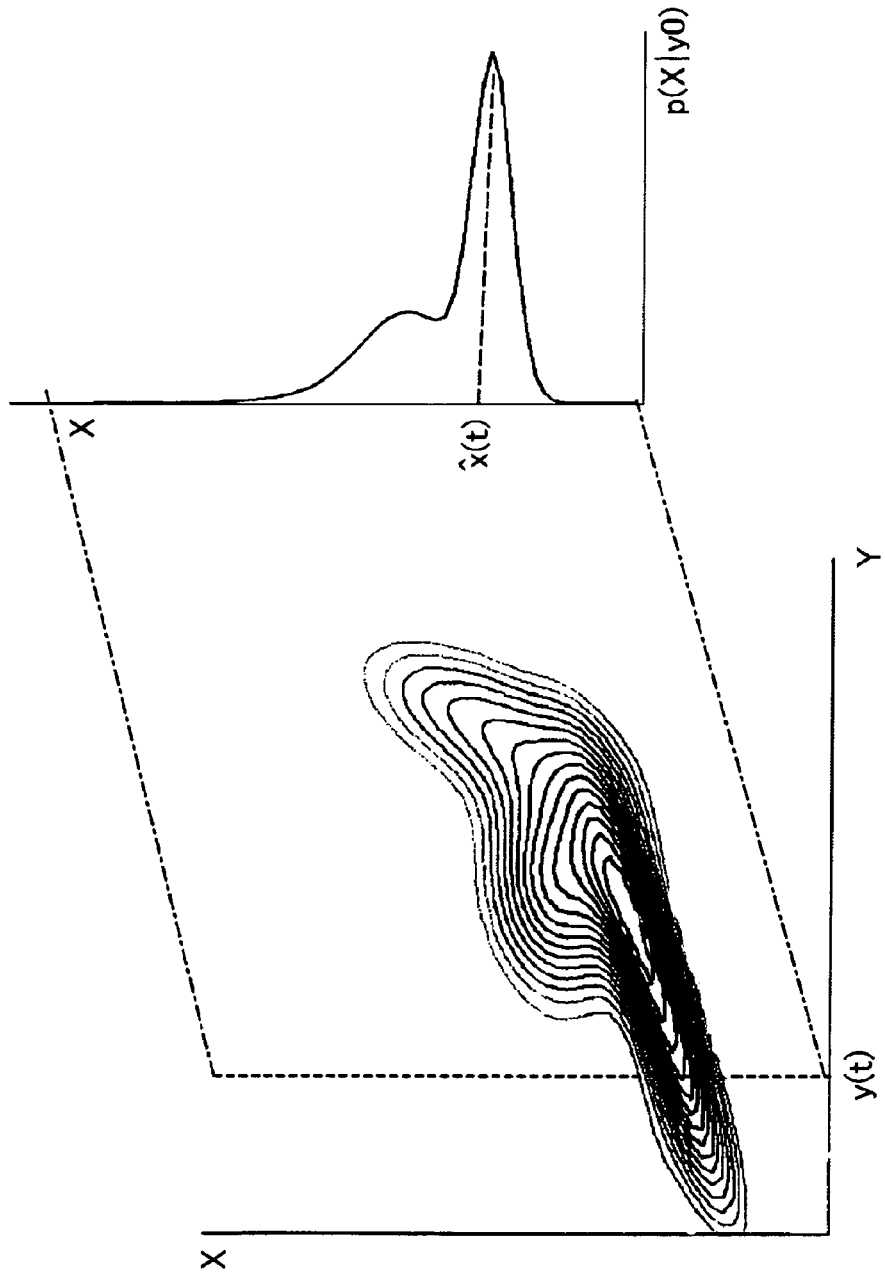
FIG. 2 is an explanatory graph representing a schema related to estimation of a driving action by a maximum posterior probability.

Hereinafter, a first preferable embodiment related to a driving action estimating device, a driving support device, and a vehicle evaluating system of the present invention will be explained in detail with reference to FIG. 1 to FIG. 15.

(1) Overview of the First Embodiment

In this embodiment, by modeling driving action characteristics which are different for each individual driver, vehicle control and driving support adapted to characteristics of a driver are performed, so as to support safe driving with ease and comfort. Further, a vehicle design evaluating system using objective evaluation standards based on statistical data is built.

Here, if modeling processing of a driver and output calculation processing using a model are simple, the above application can be realized easily at a low cost.

Accordingly, in this embodiment, a driver model for each driver can be created simply using a GMM (Gaussian mixture model) for the driver model, and moreover, a driving operation action can be easily estimated and outputted by calculation that maximizes conditional probability.

Specifically, the driving action estimating device of this embodiment adopts as a driver model a Gaussian mixture model calculated by EM (Expectation Maximization) algorithm with traveling data constituted of various types of characteristic amounts such as accelerator operation amount, vehicle speed, inter-vehicle distance, and the like being learning data.

This Gaussian mixture model is constituted of parameters of a joint probability density function obtained by calculating a joint probability density distribution with the EM algorithm, and is generated for each of drivers as necessary, and further for each of characteristic amounts to be estimated such as an accelerator operation of the driver, a brake operation, an inter-vehicle distance retaining range, and the like.

Traveling data Y (=y1, y2, . . . ) are measured excluding a certain characteristic amount x from plural characteristic amounts used for a driver model, and the maximum posterior probability for the driver model with respect to the traveling data Y is calculated, to thereby estimate the characteristic amount x.

For example, a driver model for a driver A is created in advance, and auto-cruise (ACC) for automatic traveling following the front vehicle is executed.

Specifically, the traveling data Y, such as a vehicle speed and an inter-vehicle distance, excluding the characteristic amount x=accelerator operation amount are detected in the ACC, and the maximum posterior probability for the driver model A is calculated. This value is estimated as an accelerator operation amount to be actually operated by the driver A under the same condition, and the accelerator control (engine throttle control) is executed according to the estimated accelerator operation amount.

Accordingly, an accelerator operation close to a driving operation of the driver for whom the driver model is created is performed.

Further, when making a vehicle with certain design value data (performance data) travel in a virtual space by means of a traveling route model, a driver model created in advance is used to estimate characteristic amounts of various types of driving actions, so as to evaluate the performance of the vehicle.

(2) Details of the First Embodiment

FIG. 1 represents principles related to creation of driver models by the driving action estimating device in this embodiment and to estimation of driving actions based on the created driver models.

Here, regarding the creation of driver models and estimation of driving actions, there will be explained the case of using a vehicle speed V, an inter-vehicle distance F from the front vehicle, as well as primary dynamic characteristic amounts $\Delta V$, $\Delta F$ (first-order differential value) and secondary dynamic characteristic amounts $\Delta\Delta V$, $\Delta\Delta F$ (second-order differential value) thereof as characteristic amounts, an accelerator operation amount G and a primary dynamic characteristic amount $\Delta G$ as driver models for accelerator operation, and a brake operation amount B and a primary dynamic characteristic amount $\Delta B$ as driver models for brake operation.

In the driving action estimating device of this embodiment, with traveling data 1 constituted of an accelerator operation amount, a vehicle speed, an inter-vehicle distance, and so on being learning data, a driver model 2 by the GMM for each driver corresponding to the traveling data is created by the EM algorithm in advance.

When estimating a driving action (accelerator operation amount for example) by the driver, the corresponding driver model 2 is used to calculate the maximum posterior probability 4 related to measured values (V, F, $\Delta V$, ...) of the traveling data 1 at a time instant t, to thereby estimate an accelerator operation amount 5 supposed to be operated by the driver.

The driving action estimating device of this example is based on an assumption that the driver determines operation amounts of the accelerator pedal and the brake pedal based on the current vehicle speed, inter-vehicle distance, and primary and secondary dynamic characteristic amounts thereof.

The principles of creating driver models and estimating driving actions will be explained in detail below.

(A) Learning of the Driver Models

For the driver model 2 using the GMM, the learning data are required, and the traveling data 1 are used as characteristic amounts.

For the traveling data 1, time-series data for each predetermined measurement interval s (although s is arbitrary, s=0.1 second in this embodiment) are used.

The traveling data 1 are data from actual driving by the driver, who is the target for creating the driver models, and using the traveling data 1 which are measured and stored in advance enables off-line learning. In addition, it is also possible to use traveling data 1 that are measured and collected in real time while the driver is actually driving.

In the driving action estimating device of this embodiment, creating the GMM for each driver enables modeling corresponding to characteristics of each driver.

As the characteristic amounts (traveling data 1) of the driver model, as described above, there are used a vehicle speed, an inter-vehicle distance, and primary and secondary characteristic amounts thereof, as well as an accelerator pedal operation amount and a primary dynamic characteristic amount of the accelerator pedal operation amount.

Thus, by adding dynamic characteristic amounts to characteristic amounts for modeling, a consecutive temporal relationship is taken into consideration, and thereby smooth and highly natural estimation results can be obtained.

Note that in the explanation, the case where the primary and secondary dynamic characteristic amounts are used is explained, but it is also possible to use only the primary dynamic characteristic amounts.

Similarly, driver-modeling regarding the brake pedal is also possible.

Note that when creating plural driver models for the accelerator pedal, the brake pedal, the inter-vehicle distance range, and the like, the same data may be used for data other than the accelerator pedal operation amount, the brake pedal operation amount, and so on (V, F, $\Delta V$, $\Delta F$, ...).

In this embodiment, the dynamic characteristic amounts among the traveling data are obtained by calculation from measured values of the accelerator operation amount, the vehicle speed, and the inter-vehicle distance, but they may be actually measured.

Then, in this embodiment, the driver model 2 is created by calculating a mixture Gaussian distribution (GMM) for the traveling data 1.

Specifically, the joint probability density distribution for the traveling data 1 is calculated using the EM algorithm, and parameters=$\{\lambda i, \rightarrow\mu i, \Sigma i | i=1, 2, 3, \ldots M\}$ of the calculated joint probability density function are stored as the driver model 2 by the GMM in storage means such as a database.

Here, $\lambda i$ denotes weight, $\rightarrow\mu i$ denotes a mean vector group, $\Sigma i$ denotes a variance-covariance matrix group, and M denotes a mixed number. Further, one beginning with $\rightarrow$ such as $\rightarrow\mu i$ means a vector.

In this manner, in the GMM of this embodiment, a full width covariance matrix is used in consideration of a correlation between characteristic dimensions.

Note that, as the EM algorithm, estimation is performed by the EM algorithm of the mixture Gaussian distribution according to, for example, "Speech Recognition with Probability Models" by Seiichi Nakagawa (The Institute of Electronics, Information and Communication Engineers, 1988, pp. 51-54).

(B) Estimation of Driving Action (Accelerator Pedal and Brake Pedal Operation Amounts)

A driving action such as an operation amount of the pedal is estimated based on the assumption that the driver determines operation amounts of the accelerator pedal and the brake pedal based on the current vehicle speed, inter-vehicle distance, and primary and secondary dynamic characteristic amounts thereof.

Specifically, a driving action such as an operation amount of the accelerator pedal with highest probability under a given condition is estimated from a joint distribution of characteristic amounts.

This is a problem of maximizing a conditional probability and depends on calculation of the maximum posterior probability.

Specifically, the accelerator pedal operation amount $\Lambda G(t)$ and the brake pedal operation amount $\Lambda B(t)$ are estimation of a value x(t) that maximizes a conditional probability under a condition that y(t) is given, and are calculated respectively as the maximum posterior probability using the following equations (1), (2).

$$\Lambda G(t) = \arg\max p(G | \Delta G, V(t), F(t), \Delta V(t), \Delta F(t), \Delta\Delta V(t), \Delta\Delta F(t)) \quad \text{equation (1)}$$

$$\Lambda B(t) = \arg\max p(B | \Delta B, V(t), F(t), \Delta V(t), \Delta F(t), \Delta\Delta V(t), \Delta\Delta F(t)) \quad \text{equation (2)}$$

Here, one beginning with $\Lambda$, such as $\Lambda G(t)$, means an estimation value.

Further,
p(G|ΔG, V, F, ΔV, ΔF, ΔΔV, ΔΔF)
={p(G, V, F, ΔV, ΔF, ΔΔV, ΔΔF, ΔG)}/{∫∫ . . . ∫p(G, V, F, ΔV, ΔF, ΔΔV, ΔΔF, ΔG)dΔG, dV, dF, dΔV, dΔF, dΔΔV, dΔΔF},
p(B|ΔB, V, F, ΔV, ΔF, ΔΔV, ΔΔF)
={p(B, V, F, ΔV, ΔF, ΔΔV, ΔΔF, ΔB)}/{∫∫ . . . ∫p(B, V, F, ΔV, ΔF, ΔΔV, ΔΔF, ΔB)dΔB, dV, dF, dΔV, dΔF, dΔΔV, dΔΔF}.

In the equations (1), (2), t denotes a time instant, G, B, V, F, A denote an accelerator pedal operation amount, a brake pedal operation amount, a vehicle speed, an inter-vehicle distance, and a dynamic characteristic amount, respectively.

However, regarding values of the accelerator pedal and the brake pedal which maximize the conditional probability, numerical integration may be performed at certain unit widths (for example, 100 units from 0 to 10000) in a section from the minimum value to the maximum value to obtain a probability, and values for the accelerator pedal and the brake pedal when the probability is the highest may be taken as estimation results.

FIG. 2 represents a schema related to estimation of a driving action by the maximum posterior probability.

In FIG. 2, for simplicity, there is shown a case where Λx(t) is estimated when a characteristic amount y(t) at a certain time instant t is given.

Figure 3:
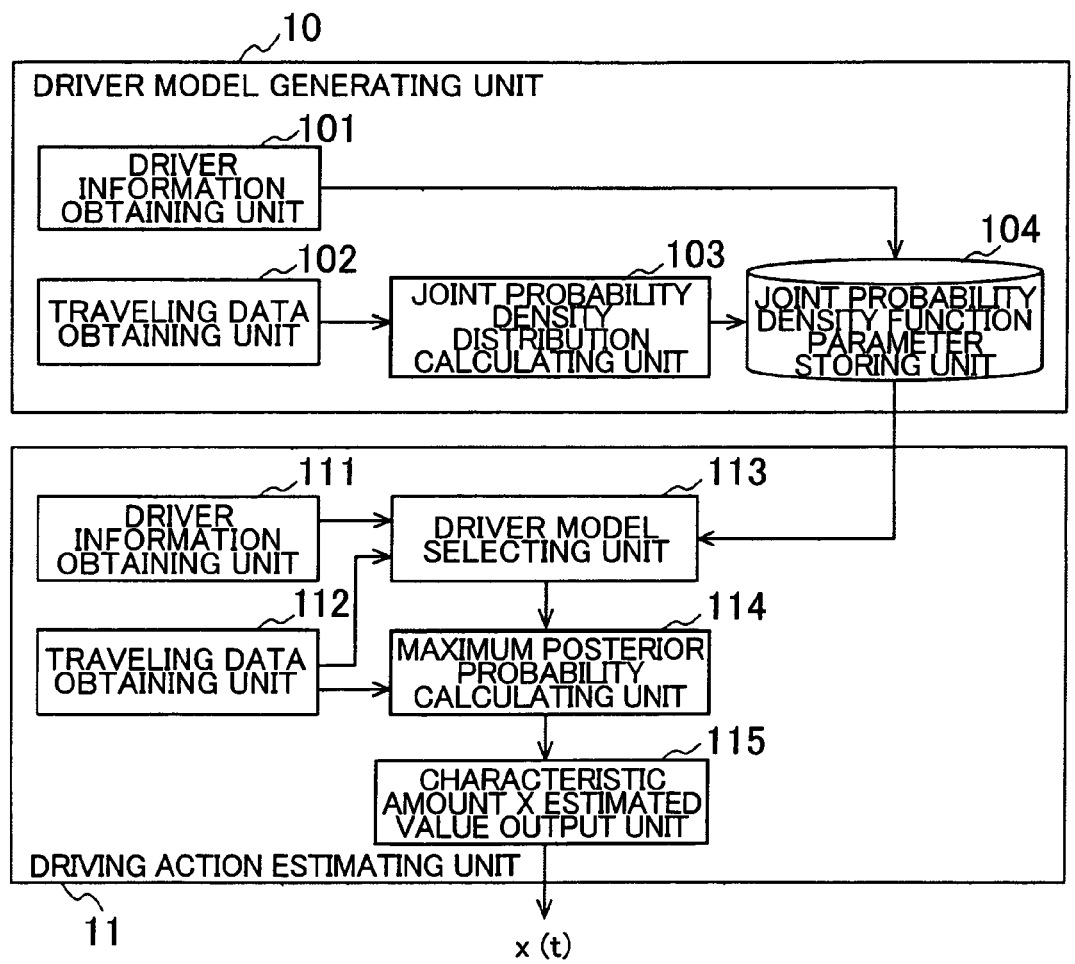
FIG. 3 is an explanatory diagram representing a structure of the driving action estimating device.

FIG. 3 represents a structure of the driving action estimating device.

The driving action estimating device in this embodiment has a driver model generating unit 10 and a driving action estimating unit 11.

This driving action estimating device is realized by a computer system having a CPU, a ROM, a RAM, and so on.

In addition, by using a driver model generated by another device, the driving action estimating device can also have a structure not including the driver model generating unit 10.

The driver model generating unit 10 includes a driver information obtaining unit 101, a traveling data obtaining unit 102, a joint probability density distribution calculating unit 103, and a joint probability density function parameter storage unit 104.

The driver information obtaining unit 101 is information for correlating a generated driver model with a driver, and is configured of driver IDs. Specifically, each driver ID identifies a driver at the time when traveling data obtained by the traveling data obtaining unit 102 are measured.

The traveling data obtaining unit 102 obtains traveling data as learning data for generating a driver model by the GMM.

FIG. 4 represents traveling data obtained by the traveling data obtaining unit 102.

As shown in FIG. 4, as the traveling data, there exist traveling environment data (a) and driver operation data (b).

However, in the traveling data, items that can be used as data are listed, and not all of the data are necessary. Appropriate selection of data is made according to a driver model to be generated.

As shown in FIG. 4A, the traveling environment data include traveling condition data and road condition data.

The traveling condition data change according to the travel and the environment, and there exist data of vehicle speed, inter-vehicle distance, weather, presence of traffic jam (degree of traffic jam), brightness, and the like.

The road condition data represent a road condition and do not change according to the environment. As the road condition data, there exist road type, pavement form, road width, number of lanes, friction coefficient, irregularity coefficient, bend curvature, cant, gradient, visibility, and the like.

As shown in FIG. 4B, as the driver operation data, there exist steering wheel operation amount, accelerator pedal operation amount, brake pedal operation amount, inter-vehicle distance retaining range amount, and the like. The driver operation data often become a driving action (estimated value of the characteristic amount x) estimated using a generated driver model. Accordingly, a number of driver operation data according to the number of driver models to be generated are obtained. For example, when creating a driver model for accelerator pedal operation and a driver model for brake operation, the accelerator pedal operation amount and the brake pedal operation amount are obtained.

The both are obtained also when generating a driver model common to the accelerator operation and the brake operation.

The traveling data obtained in the traveling data obtaining unit 102 may be obtained at once from traveling data which are measured and stored in advance, or may be obtained sequentially from data detected at each predetermined sampling time while the driver is actually driving.

The joint probability density distribution calculating unit 103 (FIG. 3) calculates a joint probability density distribution in the Gaussian mixture model with the obtained traveling data being learning data.

Joint probability density function parameters $\{\lambda i, \rightarrow \mu i, \Sigma i\}$ obtained as results of calculation by the joint probability density distribution calculating unit 103 are stored in the joint probability density function parameter storage unit 104 in correlation with the driver ID obtained in the driver information obtaining unit 101.

Note that the joint probability density function parameters to be stored are stored such that it is possible to distinguish for whom (driver ID) and what (driving action to be estimated) the driver model is for.

Figure 5:
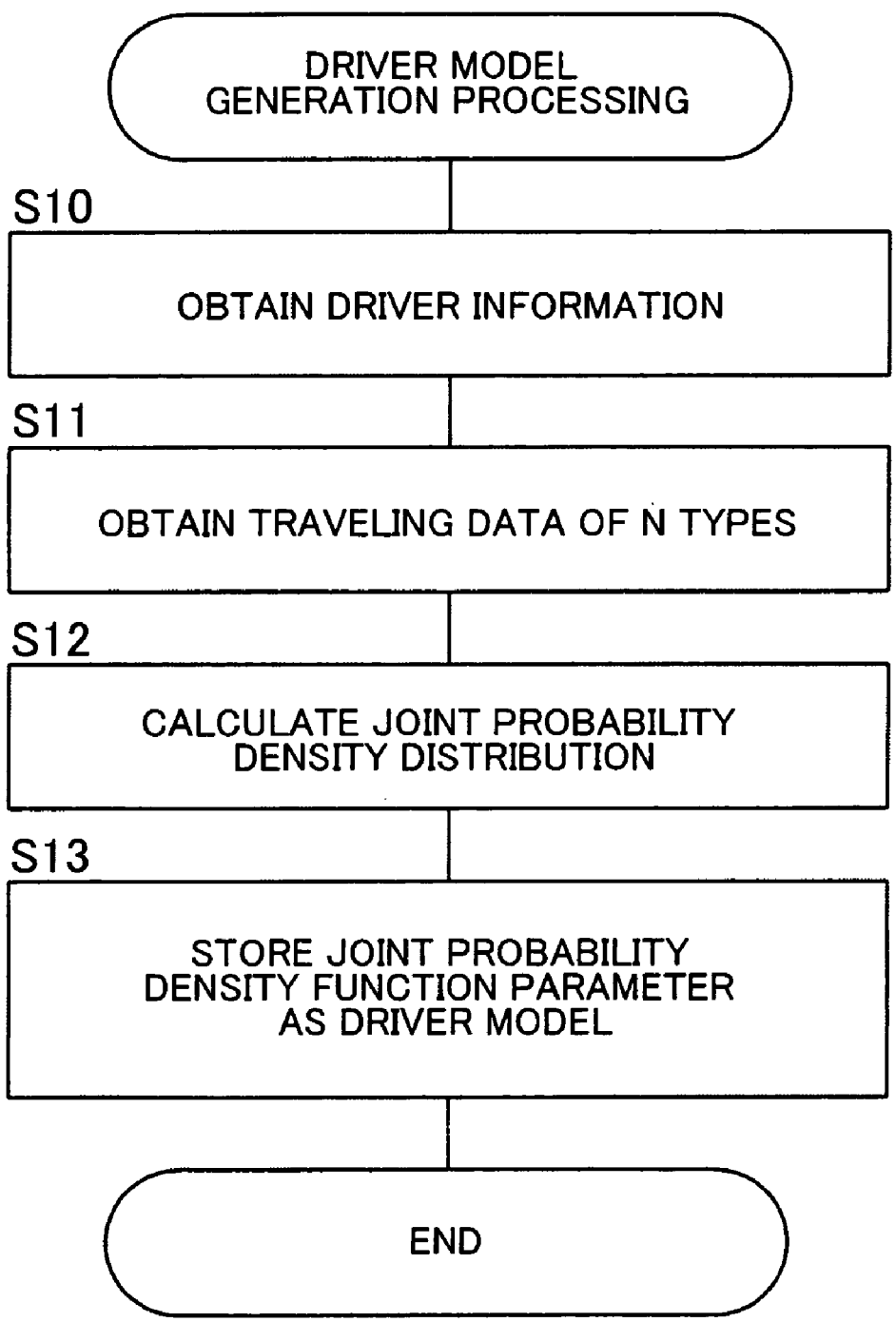
FIG. 5 is a flowchart representing driver model generation processing by the driver model generating unit.

FIG. 5 is a flowchart representing driver model generation processing by the driver model generating unit 10 structured as described above.

Driver information is obtained by the driver information obtaining unit 101 (step 10), and traveling data are obtained at once or sequentially by the traveling data obtaining unit 102 (step 11).

Note that the order of step 10 and step 11 may be reversed or in parallel.

Next, in the joint probability density distribution calculating unit 103, a joint probability density distribution is calculated with the obtained traveling data being learning data (step 12), a joint probability density function parameter is correlated with the driver information as a driver model and stored in the joint probability density function parameter storage unit 104 (step 13), and the processing is finished.

In FIG. 3, the driving action estimating unit 11 has a driver information obtaining unit 111, a traveling data obtaining unit 112, a driver model selecting unit 113, a maximum posterior probability calculating unit 114, and a characteristic amount x estimated value output unit 115.

The driver information obtaining unit 111 obtains a driver ID for identifying the target of a driver model.

This driver information is obtained mainly via input by an operator (driver himself/herself or another operator).

Note that information by which the driver can be identified, such as weight, height, and/or the like of the driver may be adopted as the driver information and stored in correlation with the driver ID in advance, and then the driver ID may be identified by obtaining the driver information.

In the traveling data obtaining unit 112, traveling data (N−1 types of characteristic amounts) excluding a driving action (characteristic amount x) estimated by the driver model are obtained from the traveling data (N types of characteristic amounts) used when a driver model to be used is generated in the driver model generating unit 10.

Based on the driver ID obtained in the driver information obtaining unit 111 and the traveling data obtained in the traveling data obtaining unit 112, the driver model selecting unit 113 selects a driver model to be applied (joint probability density function parameter) from the joint probability density function parameter storage unit 104.

The maximum posterior probability calculating unit 114 applies the traveling data obtained in the traveling data obtaining unit 112 to the driver model selected in the driver model selecting unit 113, and calculates the maximum posterior probability using the above equations (1), (2), and the like.

The characteristic amount x estimated value output unit 115 outputs the value calculated in the maximum posterior probability calculating unit 114 as an estimated value of the characteristic amount x.

Figure 6:
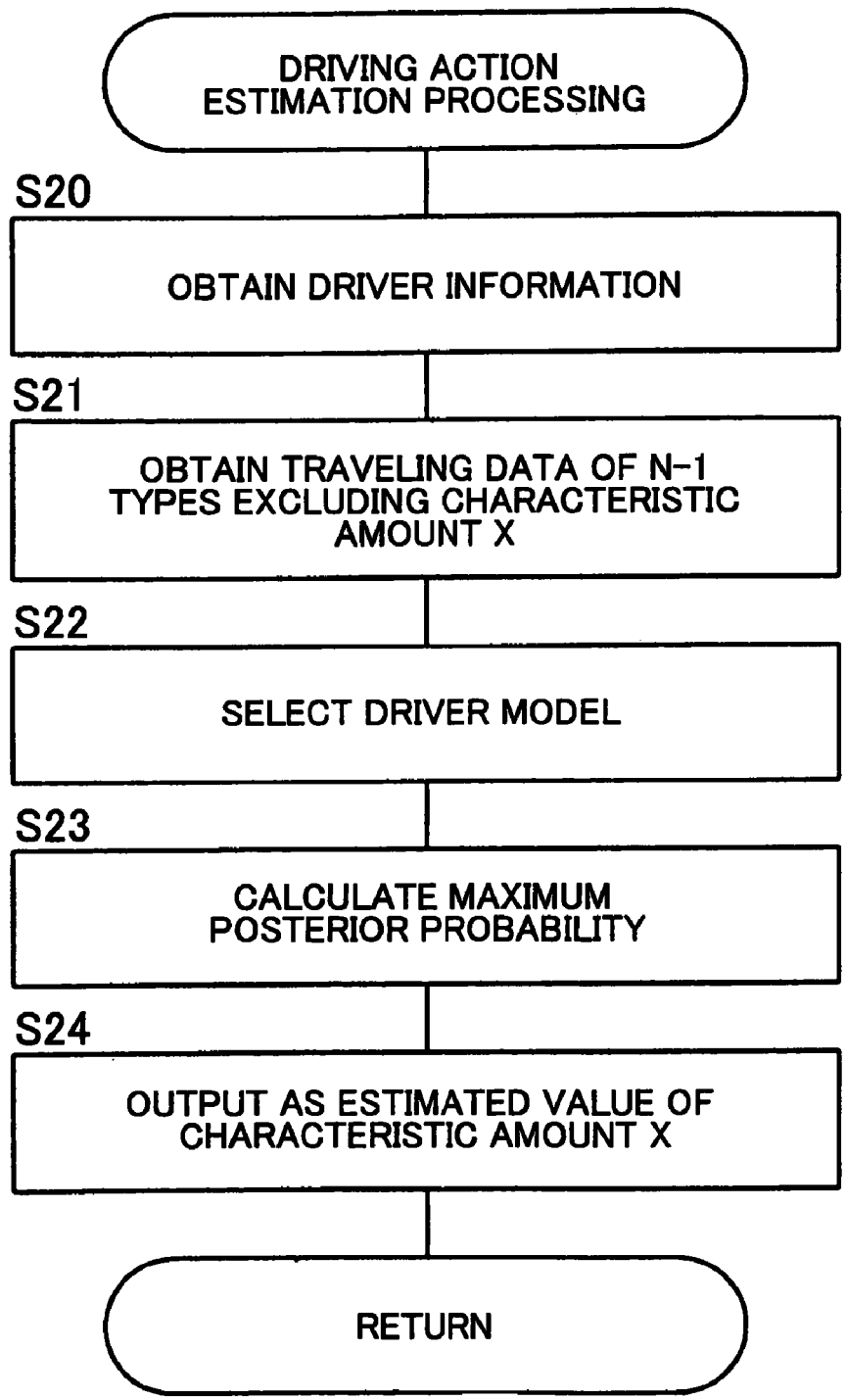
FIG. 6 is a flowchart representing processing of estimating a certain driving action using the generated driver models.

FIG. 6 is a flowchart representing processing of estimating a certain driving action using the generated driver model.

First, driver information is obtained by the driver information obtaining unit 111 (step 20).

Then, in the traveling data obtaining unit 112, traveling data at the present moment (time instant t) are obtained (step 21). The traveling data to be obtained here are N−1 types of traveling data excluding the characteristic amount x.

Note that the order of step 20 and step 21 may be reversed or processed in parallel.

Then, according to the driver information and traveling data, the corresponding joint probability density function parameter (driver model) is selected and read from the joint probability density function parameter storage unit 104 according to the driver information and the traveling data (step 22).

Note that without using the traveling data for selecting the driver model, the driver model may be selected from the driver information. In this case, the driver model may be selected before obtaining the traveling data.

Further, depending on a device to which the driving action estimating device is applied, for example an automatic cruise control device (ACC device) which will be described later, it is possible that the driver model is selected in advance, and in this case, step 20 and step 22 may be omitted as necessary.

Next, in the maximum posterior probability calculating unit 114, the obtained traveling data are applied to the selected driver model so as to calculate the maximum posterior probability (step 23).

The maximum posterior probability calculation is performed by the above equation (1) when the driving action (characteristic amount x) to be estimated is the accelerator operation amount, or by the equation (2) when it is the brake operation amount.

Then, the calculated calculation result in the maximum posterior probability calculating unit 114 is outputted as an estimated value of the characteristic amount x at a time instant t by the driver model from the characteristic amount x estimated value output unit 115 (step 24), and the processing returns to the main routine.

(3) Driving Support Device

Next, a driving support device as an application example using the above-described driving action estimating device will be explained.

This driving support device performs automatic cruise control (ACC) following the front vehicle. With this driving support device, the inter-vehicle distance, the accelerator operation, and the brake operation while the ACC is operated are automatically operated using the driver model generated from the traveling data of the driver while driving, so that the ACC close to the traveling feeling when the driver is driving by himself/herself is performed, which eliminates uncomfortable feeling in the driver.

(4) Overview of the Driving Support Device

Each driver has peculiarities when performing driving. In a conventional ACC operation, the automatic traveling is performed so as to simply keep the vehicle speed or the inter-vehicle distance to a constant value, and this presents a problem such as feeling uncomfortable because the way of using the accelerator and brake when adjusting the vehicle speed time, the inter-vehicle distance, or the distance from the front vehicle is different from his/her (driver's) peculiarities.

In the driving support device of this embodiment, a driver model is generated in advance with traveling data being learning data from actual driving operation by the driver in a state where the ACC is operable. Accordingly, the generated driver model reflects the driver's peculiarities in driving operation, such as the relationship between the vehicle speed and the inter-vehicle distance, an operation amount of the accelerator or brake when adjusting a distance, and the like.

In other words, the driver's peculiarities related to an inter-vehicle retaining operation is learned as a driver model from usual driving by the driver and stored.

The generated driver model is generated by correlating three pieces of information, which are own vehicle data (accelerator operation amount, brake operation amount, vehicle speed, . . . ), front vehicle data (inter-vehicle distance, relative speed, vehicle type, . . . ), and road environment data (surrounding brightness, visibility, tunnel, rainfall, road surface μ, lane width, degree of congestion of the road, and the like).

Besides geographical information of the surroundings, the road environment data include information, which changes according to time, place, and occasion, such as surrounding brightness and weather, road surface condition, degree of congestion of the road, and the like.

As such data, the surrounding darkness and raining condition are estimated from a clock (time), a headlight switch, a wiper switch, and the like.

Further, surrounding information such as the type of the front vehicle may be obtained proactively with an illuminometer, a rainfall sensor as well as a road surface μ detecting sensor, lane recognition device, various sensors for observing the degree of surrounding congestion, an image recognition device, and/or the like being mounted, or a weather forecast or VICS information may be obtained from a network.

Then, when the ACC is executed (during the automatic cruise control), the inter-vehicle distance from the front vehicle is monitored and retained so as to free the driver from the accelerator operation, similarly to the normal ACC.

Specifically, while executing the ACC, current road environment information is collected, and the driver model created in advance is used to estimate the accelerator operation amount, the brake operation amount, and so on.

Based on this estimated value, the inter-vehicle distance is adjusted according to an inter-vehicle distance retaining range estimated amount, and the engine throttle and the brake are controlled according to an accelerator operation estimated amount and a brake operation estimated amount, thereby performing the automatic cruise control of the vehicle.

Here, the inter-vehicle distance retaining range estimated amount is calculated from the inter-vehicle distance usually kept by the driver from the front vehicle in a scene similar to the current situation, and thereby reflects the range of the inter-vehicle distance preferred by the driver in this scene.

The accelerator operation estimated amount is calculated from the accelerator operation usually performed when the driver adjusts the inter-vehicle distance in a scene similar to the current situation, and thereby reflects a manner of operation preferred by the driver for reducing the distance (to catch up quickly, to catch up slowly, or the like) when the distance from the front vehicle becomes longer in the scene.

The brake operation estimated amount is calculated from the brake operation usually performed when the driver adjusts the inter-vehicle distance in a scene similar to the current situation, and thereby reflects a manner of operation preferred by the driver for increasing the distance (to increase it quickly, to increase it slowly, or the like) when the distance from the front vehicle becomes shorter in the scene.

Thus, the inter-vehicle distance is kept by operation which reproduces the peculiarities of the driver, and thereby uncomfortable feeling experienced by the driver can be reduced.

Further, a peculiarity in taking the inter-vehicle distance, which varies also due to external factors such as the surrounding brightness, weather, and/or road surface condition, is also reproduced, and thereby the system can be made closer to the driver's sensitivity.

(5) Details of the Driving Action Estimating Device

Figure 7:
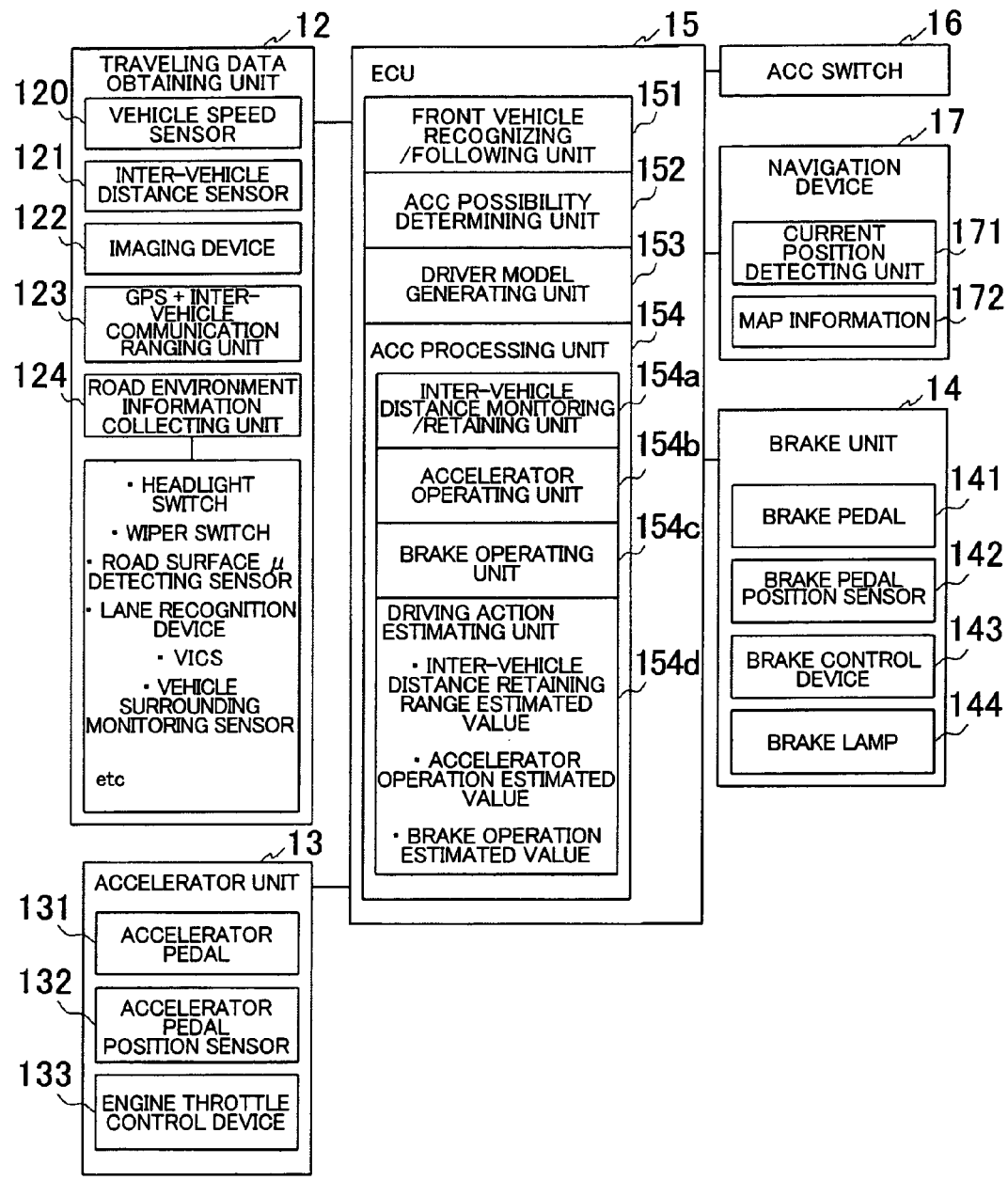
FIG. 7 is a structure diagram of a driving support device to which the driving action estimating device is applied.

FIG. 7 represents a structure of the driving support device to which the driving action estimating device is applied.

The driving support device has a traveling data obtaining unit 12, an accelerator unit 13, a brake unit 14, an ECU (electronic control device) 15, an ACC switch 16, and a navigation device 17.

Note that the structure of the driving support device explained with FIG. 7 is not needed in its entirety, but for explaining units and devices which can be used for performing the automatic cruise control. It is possible to structure the driving support device by making appropriate selection therefrom according to the function or the like of a driving support device to be adopted.

The traveling data obtaining unit 12 has a vehicle speed sensor 120 for detecting the vehicle speed of the own vehicle, an inter-vehicle distance sensor 121 for detecting the inter-vehicle distance from the front vehicle, an imaging device 122 which captures a forward image from the vehicle, a GPS+inter-vehicle communication ranging unit 123, and a road environment information collecting unit 124.

The GPS+inter-vehicle communication ranging unit 123 identifies the position (latitude, longitude) of the own vehicle by a GPS device and receives coordinate values (latitude, longitude) of the front vehicle by inter-vehicle communication with the front vehicle, so as to calculate the inter-vehicle distance between both the vehicles.

The road environment information collecting unit 124 collects road environment information from devices and units such as a headlight switch, a wiper switch, a road surface μ detecting sensor, a lane recognition device, VICS, a vehicle surrounding monitoring sensor, and the like.

The accelerator unit 13 has an accelerator pedal 131, an accelerator pedal position sensor 132, and an engine throttle control device 133.

The brake unit 14 has a brake pedal 141, a brake pedal position sensor 142, a brake control device 143, and a brake lamp 144.

The ECU 15 has a front vehicle recognition/following unit 151, an ACC possibility determining unit 152, a driver model generating unit 153, and an ACC processing unit 154.

The ACC processing unit 154 has an inter-vehicle distance monitoring/retaining unit 154a, an accelerator operating unit 154b, a brake operating unit 154c, and a driving action estimating unit 154d.

The driving action estimating unit 154d calculates respective estimated values of inter-vehicle distance retaining range, accelerator operation, and brake operation.

The ECU 15 is composed of a computer system having respective units of CPU, ROM, RAM, and interface.

The ACC switch 16 is a switch by which the driver selects whether to execute the ACC traveling or not.

When this ACC switch 16 is off, the driver model is generated.

Further, when the ACC switch 16 is on, the generated driver model is used to estimate a driving operation amount, and the automatic cruise control according to the estimated amount is performed.

The navigation device 17 has a current position detecting unit 171, map information 172, and so on.

Note that the current position detecting unit 171 is configured to detect the current position (latitude, longitude) of the vehicle by a GPS receiving device or the like and function as a GPS for the traveling data obtaining unit 12.

The operation in the driving support device structured as above will be explained below.

Figure 8:
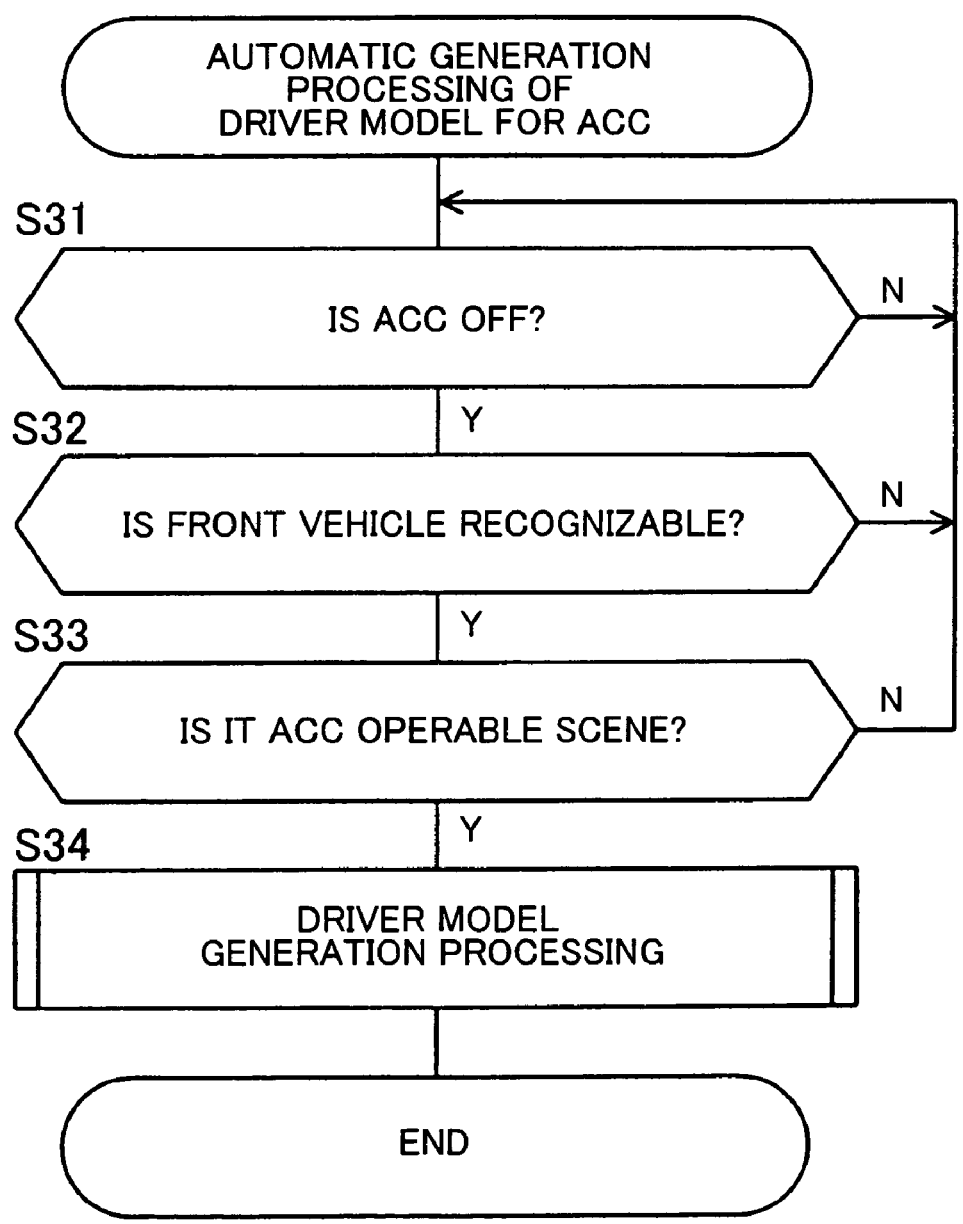
FIG. 8 is a flowchart representing automatic generation processing operation of a driver model for ACC.

FIG. 8 represents automatic generation processing of a driver model for the ACC.

First, the ECU 15 determines whether the ACC switch 16 is off or not (step 31).

When the ACC switch 16 is on (that is, 31; N), the driver is requesting the ACC traveling. Thus, the generation of driver model is not performed, and turning off of the ACC switch 16 is monitored.

On the other hand, when the ACC switch 16 is off (step 31; Y), the ECU 15 determines whether the front vehicle is recognizable or not (step 32).

The recognition of the front vehicle is determined to be recognizable when it is recognizable in the front vehicle recognition/following unit 151 and when the distance from the front vehicle is detected by the inter-vehicle distance sensor 121. The recognition and following of the front vehicle in the front vehicle recognition/following unit 151 is performed with a captured forward image of the vehicle captured by the imaging device 122.

When the front vehicle cannot be recognized (step 32; N), the inter-vehicle distance data cannot be obtained and the driver model for ACC cannot be created, and thus the processing returns to step S31.

On the other hand, when the front vehicle can be recognized (step 32; Y), then the ECU 15 determines whether it is a scene where the ACC is operable or not from the map information of the navigation device 17. For example, it is determined to be traveling on a road where the ACC is operable when traveling on an expressway or an expressway in the capital, or when traveling on a road where there is no merging lane for a predetermined distance in a toll road or a by-pass road.

The ECU 15 returns to step 31 to repeat the processing when it is a scene where the ACC is not operable (step 33; N).

On the other hand, when it is a scene where the ACC is operable (step 33; Y), the ECU 15 executes driver model generation processing explained in FIG. 5 (step 34), and finishes the processing.

In this driver model generation processing, a driver model for the inter-vehicle distance retaining range, a driver model for the accelerator operation, and a driver model for the brake operation are generated.

Thus, in the driving support device of this embodiment, the driver models are generated automatically when the ACC switch 16 is on based on actual driving conditions in the environment where the ACC traveling is actually executed. Consequently, the respective generated driver models reflect the driver's peculiarities in driving operation such as the relationship between the vehicle speed and the inter-vehicle distance, an operation amount of the accelerator or the brake when adjusting a distance, and the like.

Next, the operation when the ACC traveling is actually executed using the driver models generated as described above will be explained.

Figure 9:
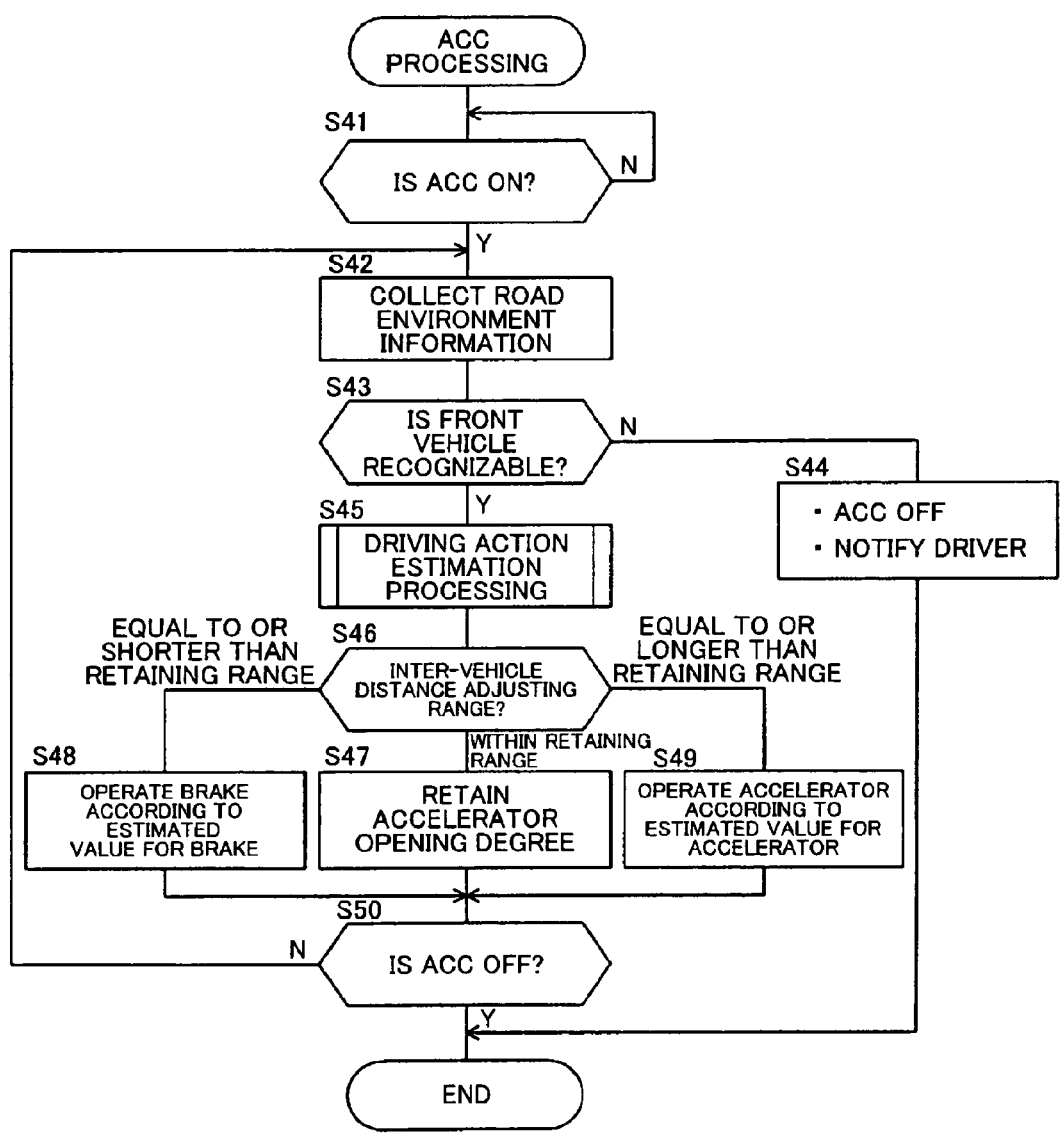
FIG. 9 is a flowchart representing an operation of ACC processing.

FIG. 9 is a flowchart representing an operation of ACC processing.

The ECU 15 monitors whether the ACC switch 16 is turned on or not (step 41).

When turning-on of the ACC switch 16 is detected (step 41; Y), the ECU 15 collects road environment information (step 42). Here, the road environment information collected by the ECU 15 is traveling data excluding operation amounts to be estimated (accelerator operation amount, brake operation amount, and inter-vehicle distance retaining range estimated amount) from the traveling data used in the driver model generation processing (step 34).

Next, the ECU 15 determines whether the front vehicle to be followed can be recognized or not in the front vehicle recognizing/following unit 151 (step 43).

When the front vehicle cannot be recognized (step 43; N), the automatic cruise control cannot be retained, and hence the ACC switch 16 is turned off, which is notified to the driver by voice or image (step 44) and thereby the processing is finished.

On the other hand, when the front vehicle can be recognized (step 43; Y), the ECU 15 executes the driving action estimation processing explained in FIG. 6 (step 45), and calculates the inter-vehicle distance retaining range estimated amount, accelerator operation estimated amount, and brake operation estimated amount.

Then, the current inter-vehicle distance is determined (step 46), and when it is within an inter-vehicle distance adjusting range, the ECU 15 retains the current accelerator opening degree (step 37).

On the other hand, when the vehicle distance is equal to or shorter than the inter-vehicle distance adjusting range, the ECU 15 controls the brake control device 143 according to the estimated value for the brake estimated by the driver model for brake operation (step 48).

Further, when the inter-vehicle distance is equal to or longer than the inter-vehicle adjusting range, the ECU 15 controls the engine throttle control device 133 according to the estimated value for the accelerator estimated by the driver model for accelerator operation (step 49).

Then, the ECU 15 determines whether the ACC switch 16 is turned off or not (step 50). When it is not turned off (step 50; N), the ECU 15 returns to step 42 to continue the ACC driving, and otherwise, when it is turned off (step 50; Y), the ECU 15 finishes the processing.

Thus, according to the driving support device of this embodiment, driver models reflecting peculiarities in driving operation of the driver such as a relationship between the vehicle speed and an inter-vehicle distance, an operation amount of the accelerator or the brake when adjusting a distance, and the like are generated, and the accelerator (engine throttle) and the brake are operated based on the accelerator operation amount, the brake operation amount, and the inter-vehicle distance adjusting range estimated by the driver models. Therefore, the ACC close to the driver's traveling feeling is realized.

(6) Vehicle Evaluating System

Next, a vehicle evaluating system that is a second application example using the explained driving action estimating device will be explained.

This vehicle evaluating system generates a driver model based on traveling data when plural drivers such as a professional driver and an ordinary driver actually travel with various types of vehicle performances and traveling conditions.

Then, instead of evaluating the performance of a vehicle by actually driving the vehicle, this vehicle evaluating system allows operation on a virtual traveling route, which is developed using a driving simulator, using an estimated value of the generated driver model (steering wheel operation amount, operation amount of the accelerator pedal, operation amount of the brake pedal, or the like), to thereby evaluate various items such as acceleration performance, deceleration performance, steering performance, and stable traveling performance of the vehicle.

(7) Details of the Vehicle Evaluating System

Figure 10:
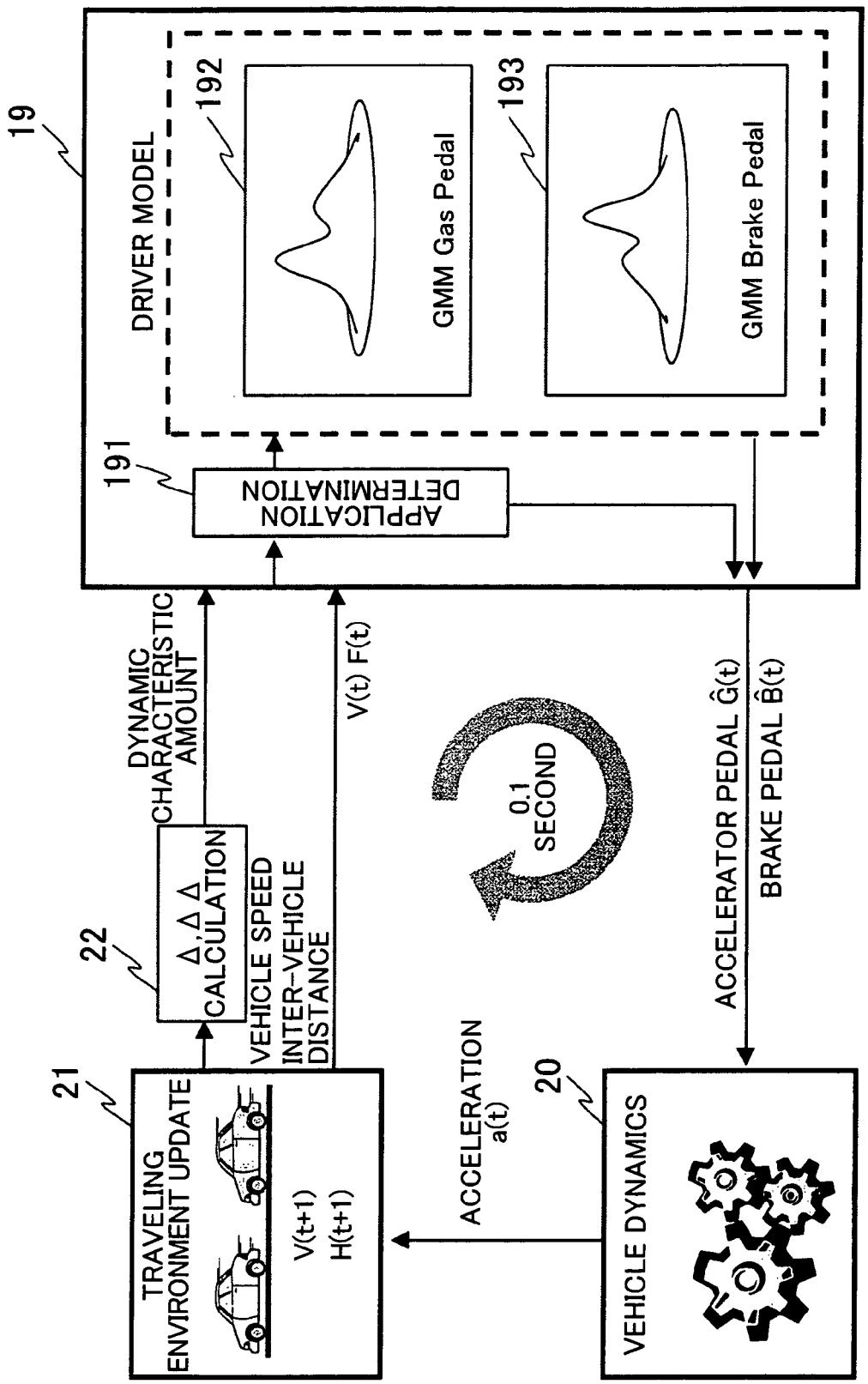
FIG. 10 is a conceptual explanatory diagram representing an overview of a vehicle evaluating system.

FIG. 10 represents an overview of the vehicle evaluating system.

As shown in FIG. 10, the vehicle evaluating system has a driver model 19 based on GMM for estimating a pedal operation amount by the driver, a vehicle dynamics calculating unit 20 which calculates an added vehicle speed a(t) of the own vehicle based on the estimated pedal operation amount, a traveling environment updating unit 21 which updates the vehicle speed v(t) and the inter-vehicle distance F(t) using the added vehicle speed a(t) of the own vehicle and the position of the preceding vehicle, and a dynamic characteristic amount calculating unit 22 which calculates primary and secondary change amounts (dynamic change amounts) of the vehicle speed v(t) and the inter-vehicle distance F(t).

In the driver model 19, using traveling data measured via actual traveling or using a driving simulator or the like, plural driver models are created from traveling data of drivers (for instance, 100 examples), such as a professional driver, an ordinary driver, and the like, which can be considered as a population of target users for the vehicle as the target of evaluation.

As the driver models, a driver model 192 for the accelerator and a driver model 193 for the brake are generated, and which one of them should be applied is determined and selected in an application determining unit 191.

Note that, besides the driver model 192 for the accelerator and the driver model 193 for the brake, a driver model for the steering wheel for estimating a steering amount of the steering wheel by the driver may be generated in advance, so as to allow selection of the driver model for the steering wheel in the application determining unit 191.

The driving action estimating device is applied to the driver model 19, which is a part where characteristic amounts such as the vehicle speed and the inter-vehicle distance and dynamic characteristic amounts are received, and values for the accelerator pedal and the brake pedal which should be operated by the driver are specified. This driver model 19 is based on the assumption that the driver determines operation amounts of the accelerator pedal and the brake pedal based on the current vehicle speed, inter-vehicle distance, and primary and secondary dynamic characteristic amounts thereof, as explained with the driving action estimating device.

In the vehicle dynamics calculating unit 20, the added vehicle speed is calculated from an accelerator pedal operation amount $G(t)$ and a brake pedal operation amount $B(t)$ at a certain time instant t and a vehicle speed $V(t-1)$ at a previous time instant, using a vehicle model (vehicle performance data such as vehicle weight, engine performance, brake performance, gear ratio, and the like of the vehicle as the target of estimation).

In the vehicle model, it is mounted by MATLAB (computer language configured to handle matrix operations powerfully based on FORTRAN) with reference to internal models in a driving simulator used for recording learning data.

In this vehicle model, the added vehicle speed for the vehicle is calculated in consideration of gear ratio, vehicle weight, friction coefficient of the road, and the like.

In the traveling environment updating unit 21, the added vehicle speed a(t) at the time instant t inputted from the vehicle dynamics calculating unit 20 is used to calculate the vehicle speed V(t+1) and the inter-vehicle distance F(t+1) at the subsequent time instant (t+1) and update them.

The vehicle speed and the inter-vehicle distance at the subsequent time instant (t+1) are calculated by:

$$V(t+1) = V(t) + a(t) \times T$$

$$F(t+1) = Df(t+1) - (Dm(t) + V(t+1) \times T)$$

Here, a(t) denotes the added vehicle speed outputted from the vehicle dynamics calculating unit 20, Df(t) denotes a traveling distance of the front vehicle until the time instant t, and Dm(t) denotes a traveling distance of the own vehicle until the time instant t.

Also, T is an updated time (sampling cycle) of the system, which is T=0.1 second in this embodiment.

Further, for calculating the inter-vehicle distance, it has a traveling distance at each time instant of the preceding vehicle, and a difference between the traveling distance of the preceding vehicle at the time instant t and the traveling distance of the own vehicle is obtained to thereby calculate the inter-vehicle distance.

Figure 11:
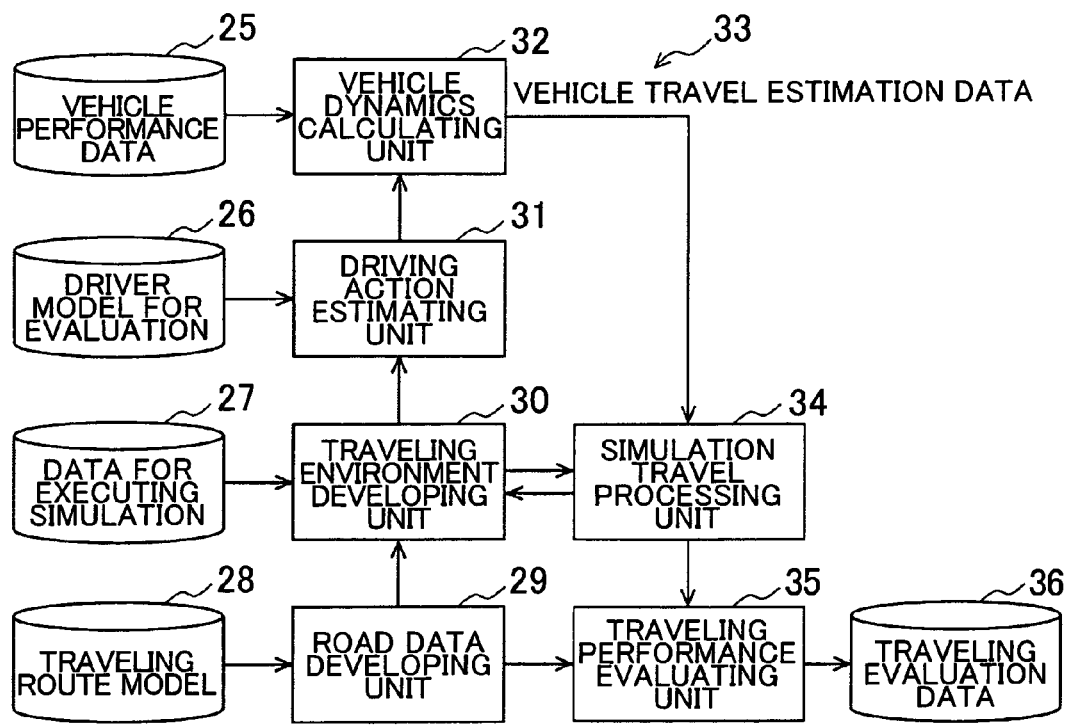
FIG. 11 is a structure diagram of the driving action estimating device.

FIG. 11 represents a structure of the driving action estimating device.

As shown in FIG. 11, the driving action estimating device is constituted of data used for evaluation, an evaluation executing unit, and evaluation result data.

As the data used, vehicle performance data 25, a driver model for evaluation 26, data for executing simulation 27, and a traveling route model 28 are used, and as the evaluation result data, traveling evaluation data 36 are outputted and stored.

As the evaluation executing unit, there are provided a road data developing unit 29, a traveling environment developing unit 30, a driving action estimating unit 31, a vehicle dynamics calculating unit 32, a simulation travel processing unit 34, and a traveling performance evaluating unit 35, which are configured by a computer system composed of a CPU, a ROM, a RAM, and so on.

The vehicle performance data 25 are performance data of the vehicle as the target of evaluation, and configured of, as shown in FIG. 12A, respective data of vehicle weight, engine performance, brake performance, gear ratio, suspension spring constant, and so on.

As the driver model for evaluation 26, the above-described driver models generated in the driving action estimating device are used.

The data for executing simulation 27 are, as shown in FIG. 12B, traveling condition data developed in a virtual space, and are configured of vehicle speed, inter-vehicle distance, weather, presence of traffic congestion, and so on. As the traveling condition data, data at each time t=t1, t2, t3 . . . are used as time-series data.

The traveling route model 28 is, as shown in FIG. 12C, data for a test traveling route developed in a virtual space.

Comparing the evaluation executing unit with the driving action estimating device explained in FIG. 10, the driving action estimating unit 31 corresponds to the driver model 19, the vehicle dynamics calculating unit 32 corresponds to the vehicle dynamics calculating unit 20, and the simulation travel processing unit 34 and the traveling environment developing unit 30 correspond to the traveling environment updating unit 21 and the dynamic characteristic amount calculating unit 22.

Next, design evaluation processing of a vehicle in the vehicle evaluating system configured as described above will be explained.

Figure 13:
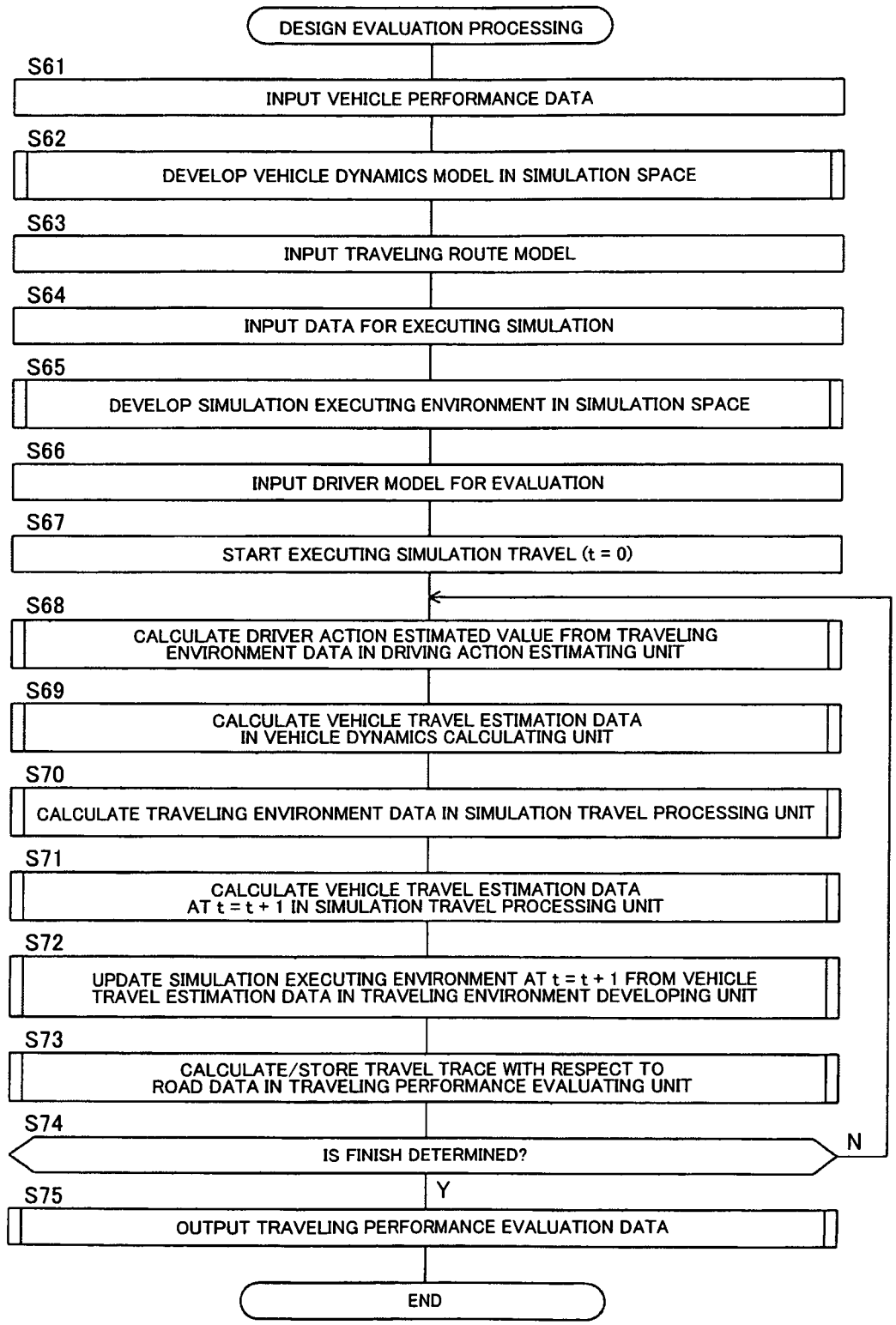
FIG. 13 is a flowchart representing an operation of design evaluating processing.

FIG. 13 is a flowchart representing the operation of the design evaluation processing.

The vehicle performance data 25 performs input to the vehicle dynamics calculating unit 32 (step 61), and the vehicle dynamics model is developed in a simulation space (step 62).

Then, the traveling route model 28 is inputted to the road data developing unit 29 (step 63), and the data for executing simulation 27 are inputted to the traveling environment developing unit 30 (step 64), thereby developing the simulation executing environment in the simulation space (step 65).

Then, the driver model for evaluation 26 is inputted to the driving action estimating unit 31, and execution of the simulation travel is started from t=0 (step 67).

Then, in the driving action estimating unit 31, driver action estimated values (accelerator pedal operation amount G(t) and brake pedal operation amount B(t)) are calculated from the traveling environment data (traveling data) at the time instant t (step 68).

Then, in the vehicle dynamics calculating unit 32, vehicle travel estimation data 33 such as the added vehicle speed a(t) are calculated using the vehicle performance data 25 such as gear ratio, vehicle weight, friction constant of the road, or the like from the accelerator pedal operation amount G(t) and the brake pedal operation amount B(t) at the time instant t, and the vehicle speed V(t−1) at the previous time (step 69).

Other than the added vehicle speed a(t), the vehicle travel estimation data 33 to be calculated are, as shown in FIG. 12D, speed of the own vehicle, inter-vehicle distance, barycentric position, tire angle, yaw rate, pitch rate, and the like.

Then, in the simulation travel processing unit 34, using the vehicle travel estimation data 33 at the time instant t calculated in the vehicle dynamics calculating unit 32, the vehicle speed V(t+1) and the inter-vehicle distance F(t+1) at the next time instant (t+1) are calculated and updated (step 70).

Also, the vehicle travel estimation data 33 at t=t+1 is calculated in the simulation travel processing unit 34 (step 71).

Then, in the traveling environment developing unit 30, the simulation executing environment at t=t+1 is updated from the vehicle travel estimation data 33 (step 72), and a travel trace with respect to the road data is calculated and stored in the traveling performance evaluating unit 35 (step 73).

Then, it is determined whether the simulation travel processing of all the data until time instant tn in the data for executing simulation 27 is finished or not (step 74), and when it is not finished (step 74; N), the processing returns to step 68 and continues the simulation using the driver models.

When the processing until the time instant tn is finished (step 74; Y), the travel estimation data are outputted from the traveling performance evaluating unit 35 and the processing is finished (step 75).

As the travel estimation data to be outputted from the traveling performance evaluating unit 35, as shown in FIG. 12E, there are outputted an acceleration curve with respect to an accelerator opening degree as acceleration performance, a deceleration curve with respect to the brake operation amount as deceleration performance, a travel curve with respect to the steering wheel operation amount as steering performance, a travel trace with respect to the road direction as stable traveling performance, and the like.

(8) Simulation Test (8-1) Learning of Driver Models with GMM

The driving data are recorded using the driving simulator for learning of GMM.

The course is a straightway, and behavior data of the preceding vehicle are adopted so that all the vehicle speeds appear so as to make the learning data have variation.

Further, the traveling is performed twice, each for ten minutes, and the amount of the two times is taken as the learning data.

Figure 14A:
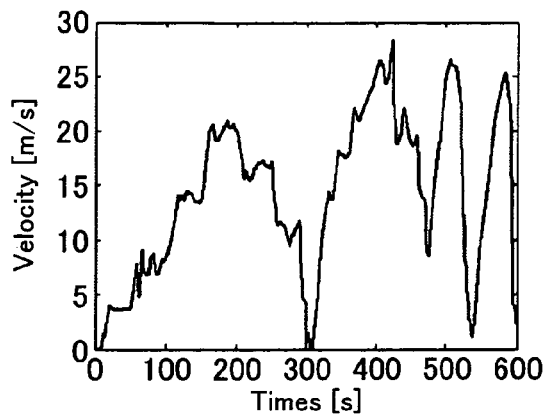
FIG. 14 shows explanatory graphs representing a behavior of a preceding vehicle and driving data for learning, and a behavior of the preceding vehicle for evaluation.
Figure 14B:
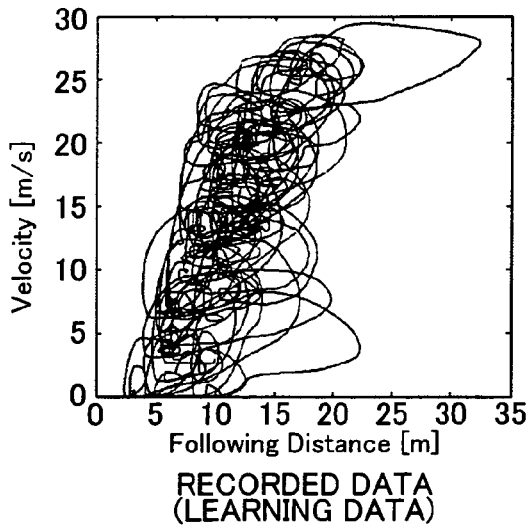

FIG. 14A shows the behavior of the preceding vehicle, and FIG. 14B shows recorded driving data.

Since the variation of the behavior of the preceding vehicle is considered, it can be seen that all the vehicle speeds appear. Models for the accelerator pedal operation and the brake pedal operation respectively are learned as multidimensional normal mixture distribution (GMM) of 16 mixtures having a full size covariance matrix.

(8-2) Simulation Results and Consideration

To evaluate the configured vehicle evaluating system, a behavior of the preceding vehicle not included in the learning data was prepared and recorded.

Figure 14C:
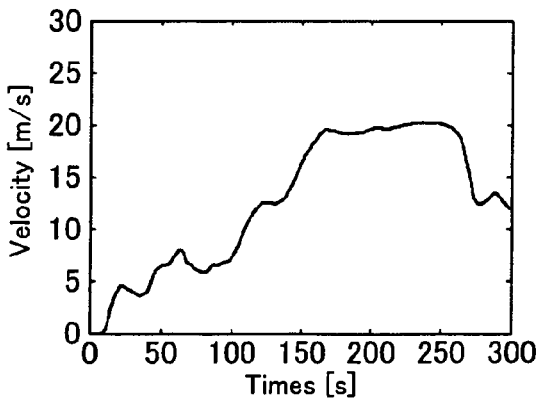

The course is a straightway, and one recorded in an actual environment is used as the behavior of the preceding vehicle. In FIG. 14C, the behavior of the preceding vehicle used for evaluation is shown.

Using the data of the preceding vehicle, a driving action was generated and compared with actual driving data.

The simulation conditions are as follows.

Learning data: 20 minutes (10 minutes, two times)

Characteristic amounts: V, F, G, ΔV, ΔF, ΔG, ΔΔV, ΔΔF

Course: straightway

Δwindow width: 0.8 seconds

The number of mixtures: 16

Update time: 0.1 seconds

FIG. 15 represents simulation results using the vehicle evaluating system of this embodiment under the above conditions.

FIG. 15 shows vehicle speed results (a), inter-vehicle distance results (b), and accelerator pedal results (c), in which solid lines are simulation results and dashed lines show actual data.

As shown in FIG. 15, regarding the accelerator pedal operation for example, characteristics of waveforms of actual accelerator operation signals are well captured, and hence it can be considered that the modeling with GMM turned out well.

As described above, the first embodiment has been explained in connection with the driving action estimating device, driving support device, vehicle evaluating system according to the present invention, but the present invention is not limited to the explained embodiment, and can be modified in various ways in the scope described in the claims.

For example, in the explained embodiment, since the driver models based on the GMM learn a relationship between a signal such as vehicle speed or inter-vehicle distance and a driving action signal from the learning data, estimation of the pedal operation amount does not turn out well when a condition not present in the learning data (edge of distribution) comes up.

For example, in following travel, travel with an inter-vehicle distance over 100 m or an inter-vehicle distance of 1 m is not included in the learning data, and when such a condition not included in the learning data comes up, the estimation will not be performed well and result in that the preceding vehicle keeps going farther or result in collision.

Accordingly, in order to avoid such situations, setting may be made such that the estimation with driver models is not performed and full-braking is applied when the inter-vehicle distance is L1 or shorter (two meters or shorter, for example), or the accelerator is fully pressed when the inter-vehicle distance is L2 or longer (100 meters or longer, for example).

Next, a second preferable embodiment related to a driver model creating device and a driving support device of the present invention will be explained in detail with reference to FIG. 16 to FIG. 36.

(9) Overview of the Second Embodiment

In this embodiment, biometric information of the driver is detected to recognize whether the driver is in his/her usual condition or not. Then, while the driver is driving, driving condition data (the own vehicle information, for example, operation amounts of accelerator, brake, and steering wheel, vehicle speed, inter-vehicle distance, degree of acceleration, and the like) are collected, and part where the driver is driving in the usual condition is extracted from the driving condition data so as to create a driver model.

Thus, without making the driver become aware, the driver model in normal times can be created automatically.

Further, the driver model is created only with the case where the driver is driving in a normal condition based on his/her biometric information being the driving action in normal times, the driver model becomes a highly precise, neutral driver model.

In this embodiment, a driver model is created for each scene (situation) of the own vehicle surrounding environment while traveling such that, for example, when there is an oncoming car and a pedestrian in a pedestrian crossing, on a national highway with three lanes on one side when making a right turn from a right turn lane in an intersection with the traffic light being green.

Also, whether the current driving action of the driver is as "usual" or deviating is monitored by comparing the driving action in normal times estimated from the created driver model with the current driving action of the driver in real time.

As indicators for comparing the "usual" driving and the current driving, "response speed" and "unsteadiness" of the driver are used for example.

Further, in this embodiment, not only by evaluating the change of a driving action based on the driver model but also by adding a change in the biometric information, information indicating the condition of the driver is determined in a complex manner, thereby detecting fatigue and/or decrease in attention of the driver with higher precision.

As a result, when there is a deviation from the original driving action of the driver, a notice, warning or information is provided about this to thereby support safe driving suited to this person.

Also, it becomes possible to detect the driver's condition in an indication stage before emergence of clear fatigue and decrease in attention, and sophisticated guidance becomes possible, such as prompting in advance to take a break before the fatigue peaks.

In this embodiment, using the GMM (Gaussian mixture model) for the driver model similarly to the first embodiment, a driver model for each driver can be created easily, and further, calculation maximizing the conditional probability allows to estimate and output a driving operation action easily.

Specifically, in the driver model creating device, the driving support device, and the driving action determining device of this embodiment, a Gaussian mixture model is adopted as the driver model, which is calculated by the EM (Expectation Maximization) algorithm with traveling data including plural types of characteristic amounts such as accelerator operation amount, vehicle speed, brake operation amount, steering operation amount, inter-vehicle distance, degree of acceleration, and so on being the learning data.

This Gaussian mixture model is configured of parameters of a joint probability density function which can be obtained by calculating a joint probability density distribution by the EM algorithm, and is generated as necessary for each driver, and further for each of the characteristic amounts to be estimated for an accelerator operation of the driver, a brake operation of the driver, an inter-vehicle distance retaining range, and the like.

Then, traveling data Y (=y1, y2, . . . ) are measured excluding a certain characteristic amount x from plural characteristic amounts used for a driver model, and the maximum posterior probability for the driver model with respect to the traveling data Y is calculated, to thereby estimate the characteristic amount x.

For example, a driver model in the same situation as a traveling environment (situation) surrounding the vehicle is used, the current own vehicle condition is inputted to the driver model, and a change over time of the driving condition thereafter (for example, the characteristic amount x=accelerator operation amount) is estimated and compared with the actual driving condition, thereby determining whether or not there is a delay in operation, unsteadiness in operation, or the like.

(10) Details of the Second Embodiment

Figure 16:
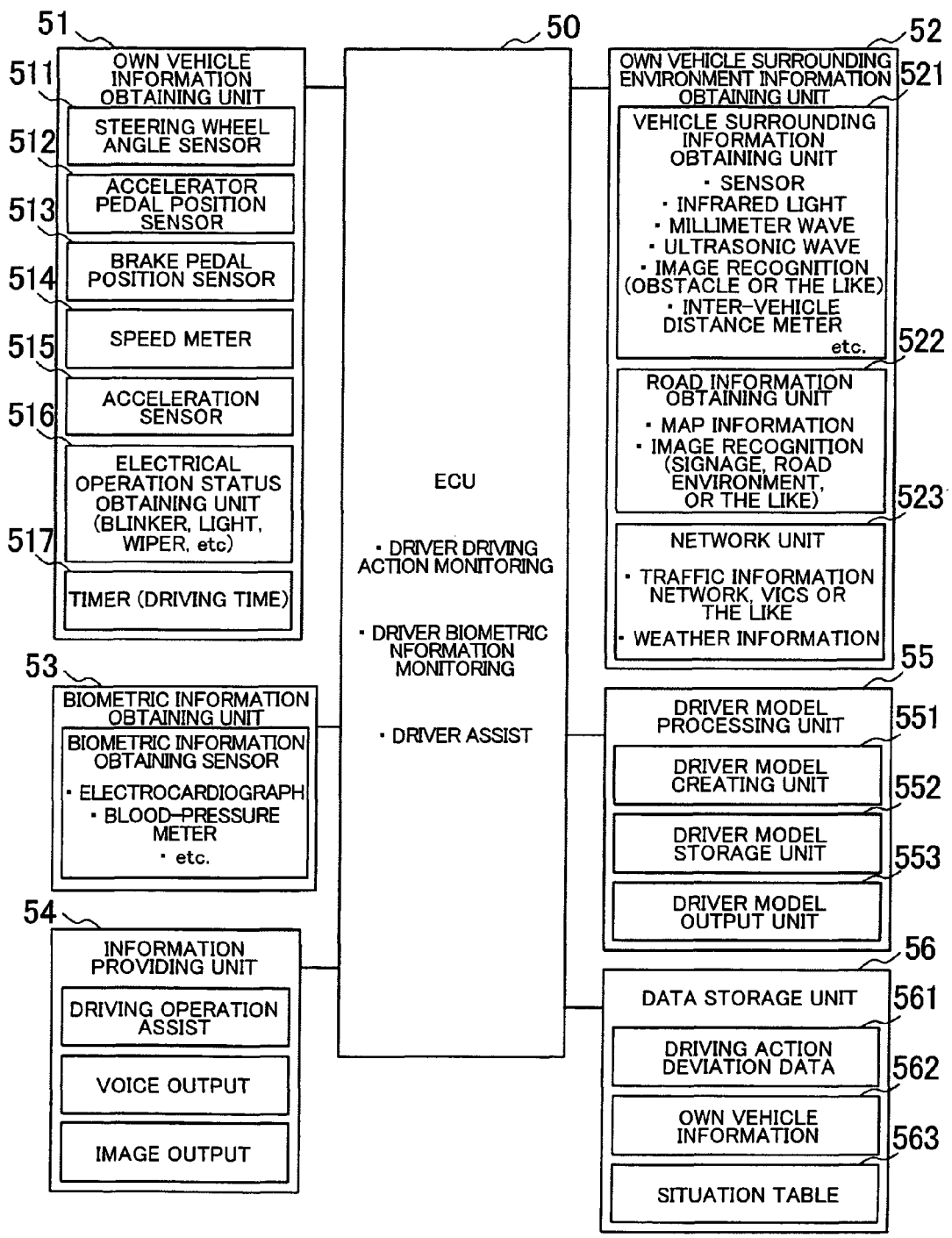
FIG. 16 is a structure diagram of a driving support device to which a driver model creating device in a second embodiment of the present invention is applied.

FIG. 16 represents the structure of the driving support device to which the driver model creating device is applied.

The driving support device has an ECU (electronic control device) 50, an own vehicle information obtaining unit 51, an own vehicle surrounding environment information obtaining unit 52, a biometric information obtaining unit 53, an information providing unit 54, a driver model processing unit 55, and a data storage unit 56.

Note that the structure of the driving support device explained with reference to FIG. 16 is not needed in its entirety, but for explaining units and devices which can be used for performing the creation of a driver model and the driving support in this embodiment. It is possible to structure the driving support device by making appropriate selection therefrom according to the function or the like of a driving support device to be adopted, and any other equipment or device having similar functions can be added and used.

The ECU 50 is composed of a computer system including respective parts of CPU, ROM, RAM, and interface.

The ECU 50 is configured to monitor a driver driving action based on the information obtained by the own vehicle information obtaining unit 51, monitor driver biometric information based on the information obtained by the biometric information obtaining unit 53, and instruct the information providing unit 54 about driver assist contents as a driving support. The ECU 50 is also configured to supply data necessary for creating and outputting a driver model to the driver model processing unit 55.

The own vehicle information obtaining unit 51 has a steering wheel angle sensor 511, an accelerator pedal sensor 512, a brake pedal sensor 513, a speed meter 514, an acceleration sensor 515, an electrical operation status obtaining unit 516, a timer 517, and other sensors.

FIG. 17 exemplarily shows own vehicle information as driving operation information obtained in the own vehicle information obtaining unit 51.

As shown in FIG. 17, the steering wheel angle sensor 511 detects the steering wheel operation amount (angle), the accelerator pedal sensor 512 detects the accelerator operation amount, the brake pedal sensor 513 detects the brake operation amount, and the speed meter 514 detects the vehicle speed.

The acceleration sensor 515 detects yawing axis acceleration, pitch axis acceleration, and roll axis acceleration.

The electrical operation status obtaining unit 516 detects a blinker operation status, a light operation status, and a wiper operation status.

The timer 517 measures various types of times such as a driving time instant, a driving time period, and the like.

The own vehicle surrounding environment information obtaining unit 52 includes a vehicle surrounding information obtaining unit 521, a road information obtaining unit 522, and a network unit 523.

The vehicle surrounding information obtaining unit 521 has various types of sensors such as an infrared sensor, a millimeter wave sensor, an ultrasonic wave sensor, an image recognition device, an inter-vehicle distance sensor, and the like. The image recognition device performs image processing of an image outside the vehicle captured by an image input device, and recognizes an existing target such as an obstacle, a pedestrian, a vehicle, and the like around the vehicle.

FIG. 18 exemplarily shows vehicle surrounding environment information obtained by the vehicle surrounding information obtaining unit 521.

As shown in FIG. 18, various information of a vehicle, a pedestrian, an obstacle, and the like are obtained by the vehicle surrounding information obtaining unit 521.

As information obtained specifically, for example, the detected type of a vehicle existing in the vicinity (passenger car, motorcycle, bicycle, or the like), inter-vehicle distance, relative speed, attribute (oncoming vehicle, vehicle traveling in parallel, vehicle going straight (left, right), and the like are obtained for each of the vehicles.

Similarly, for the pedestrian and obstacle, information regarding each of them is obtained.

The road information obtaining unit 522 includes a GPS device which detects the current location of the vehicle and map information for obtaining road information corresponding to the detected current location and surrounding information such as whether there is a traffic light or not.

Further, the road information obtaining unit 522 has an image recognition device which recognizes a signage and a surrounding environment, but this image recognition device is shared with the image recognition in the vehicle surrounding information obtaining unit 521.

FIG. 19 exemplarily shows vehicle surrounding environment information obtained in the road information obtaining unit 522.

In the road information obtaining unit 522, as shown in FIG. 19, various information such as road type, road form, road width, own vehicle position, road surface condition, road brightness, presence and status of a traffic light, road attribute (traffic regulation), and the like are obtained.

The network unit 523 connects to a traffic information network such as VICS and to a weather information center, and obtains traffic information and weather information.

FIG. 20 exemplarily shows vehicle surrounding environment information obtained in the network unit 523.

As shown in FIG. 20, traffic jam information obtained from VICS or the like includes the distance of traffic jam, the distance of congestion, presence of accident, presence of road closure, presence of chain restriction, and the like.

Further, the weather information obtained from the weather information center includes weather information such as clear, cloudy, rain, and the like, information such as rainfall probability, air temperature, and the like.

The own vehicle surrounding environment information obtained in the own vehicle surrounding environment information obtaining unit 52 is used, together with part of the own vehicle information (for example, information such as going straight, right, or left based on the steering wheel operation amount) obtained in the above-described own vehicle information obtaining unit 51, for setting a situation according to a situation table 563, which will be described later.

The biometric information obtaining unit 53 obtains biometric information for determining whether the driver who is driving the vehicle is in a normal condition or in an abnormal condition, and has various sensors, as sensors for this purpose, such as an electrocardiograph, a blood-pressure meter, a heartbeat sensor, and a sweat sensor.

When the vehicle starts to travel, the biometric information obtaining unit 53 is configured to detect the heart rate and the amount of sweat at predetermined time intervals and supply them to the ECU 50.

The heartbeat sensor is configured to detect the heart rate, for example, by sampling a heartbeat signal from a hand of the driver while driving by an electrode arranged on the steering wheel. Note that, as the heartbeat sensor, a dedicated sensor may be arranged on the body of the driver at a wrist or the like.

The sweat sensor is arranged on the steering wheel and detests a sweating condition from a change in electric current value flowing due to the sweating condition.

FIG. 21 exemplarily shows biometric information obtained in the biometric information obtaining unit 53.

In the biometric information obtaining unit 53, targets to be obtained are cardiac potential, R-R interval, heart rate, respiratory rate, body temperature, blood pressure, skin potential, amount of water loss (amount of sweat), myoelectric potential, brainwave potential, and the like.

The information providing unit 54 includes a driving operation assist unit, a voice output unit, and a screen output unit for performing a driving operation assist or warning according to the driving condition of the driver.

FIG. 22 exemplarily shows information provided by the information providing unit 54 and contents of assists.

As shown in FIG. 22, in order to perform a steering wheel assist, an accelerator operation assist, a brake operation assist or the like, as an assist to correct a driving operation by the driver, the driving operation assist unit controls output of a torque value to respective operating units. For example, when there is unsteadiness in steering operation by the driver, the torque is operated so that the steering becomes heavier, or when a pressing force on the brake is weak, an assist is made so that the output for the brake pressing amount becomes larger.

Further, according to the condition of the driver, the voice output unit outputs warning voice, and the screen output unit displays a warning screen.

The driver model processing unit 55 includes a driver model creating unit 551, a driver model storage unit 552, and a driver model output unit 553.

The driver model creating unit 551 functions as a driver model creating device, accumulates own vehicle information when the condition of the driver is a normal condition from the own vehicle information obtained in the own vehicle information obtaining unit 51, and creates a driver model from the own vehicle information of the normal condition.

The own vehicle information of the normal condition is accumulated, when this information is obtained, for every situation determined from the own vehicle surrounding environment information obtained in the own vehicle surrounding environment information obtaining unit 52, and a driver model is created for each situation.

The driver model storage unit 552 stores a driver model created in the driver model creating unit 551 for each situation.

In the driver model creating unit 551, when a predetermined amount of the own vehicle information for each situation is accumulated, a driver model of the situation is created and stored in the driver model storage unit 552. Then, every time new own vehicle information is obtained, a new driver model is created together with the own vehicle information accumulated before by the driver model of the corresponding situation, thereby updating the driver model. Note that, regarding updating of a driver model, creation and update may be performed not every time new own vehicle information of the corresponding situation is obtained but every time additional accumulation of a predetermined amount is made.

Figure 23:
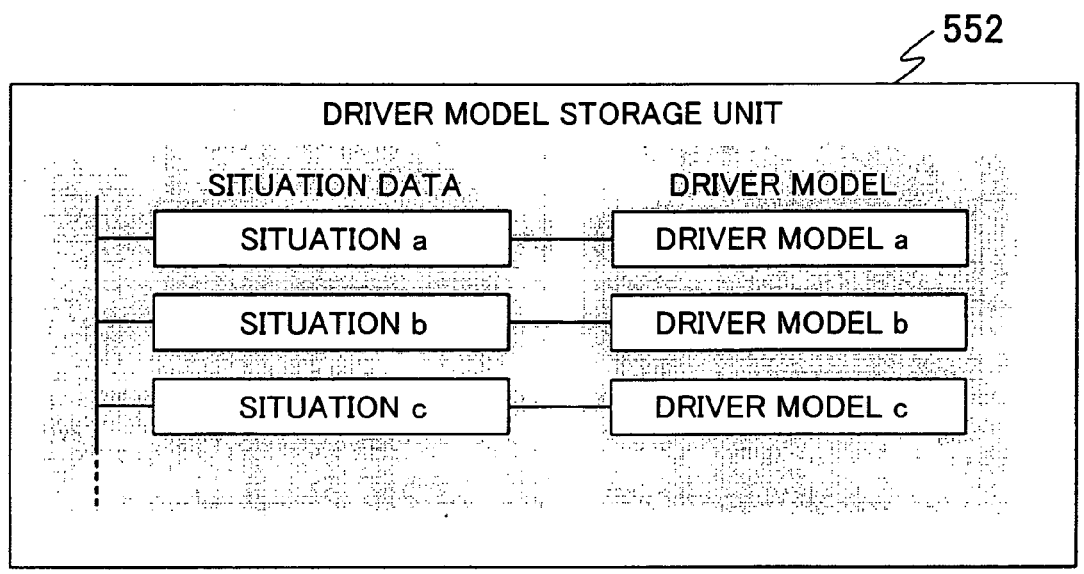
FIG. 23 is an explanatory diagram conceptually representing storage contents of a driver model storage unit.

FIG. 23 conceptually represents storage contents of the driver model storage unit 552.

As shown in FIG. 23, the driver models are categorized for each situation. The stored driver models a, b, c, . . . are linked to the corresponding situation data (situations a, b, c, . . . ), and function as tags for the system to refer to the driver models.

Thus, when searching for a driver model, a cache operation becomes possible, such as obtaining at once driver models for a case that "the driver is fatigued at a certain level."

The driver model output unit 553 estimates and outputs, based on the driver model n corresponding to a certain situation n, an operation amount of the driver in a normal condition, that is, a usual (normal-time) driving operation amount for the situation n.

By comparing this estimated driving amount with the current own vehicle information, driving action deviation data as basic data for determining the state (response delay, unstableness, or the like) of a driving action, which will be described later, are obtained at predetermined time intervals.

Note that both the functions of the driver model creating unit 551 and the driver model output unit 553 in the driver model processing unit 55 may be realized by the ECU 50, and the driver model storage unit 552 may be stored in the data storage unit 56.

The data storage unit 56 stores various data and tables needed for the driver model creation processing and the driving operation assist processing in this embodiment.

The data storage unit 56 includes a magnetic recording medium such as flexible disk, hard disk, magnetic tape or the like, a semiconductor recording medium such as memory chip, IC card or the like, a recording medium from which information is read optically such as CD-ROM, MO, PD (phase change rewritable optical disk), or the like, and a recording medium in which data and computer programs are recorded in various types of other methods.

A different medium may be used as the recording medium depending on storage contents.

In the data storage unit 56, driving action deviation data 561 and own vehicle information 562 are stored, and a situation table 563 is stored.

The driving action deviation data 561 are difference data between a driving operation amount in normal times estimated from a driver model n for a currently traveling situation n and an operation amount based on actual own vehicle information, and are calculated and stored at predetermined time intervals for the currently traveling situation n.

As the own vehicle information 562, own vehicle information when traveling in a normal condition is accumulated for every situation. At the time when a predetermined amount of the own vehicle information is accumulated, a driver model for this situation is created. Once created, the driver model is updated every time the own vehicle information of the corresponding situation is updated.

The situation table 563 is a table for determining the corresponding situations a, b, c, . . . from the obtained own vehicle information and own vehicle surrounding environment information.

FIG. 24 conceptually represents contents of the situation data.

As shown in FIG. 24, for each of the situations a, b, c, . . . corresponding to the driver models a, b, c, . . . , a situation flag for turning to the situation is set.

As the situation flag, one piece of data is selected for each small item in the own vehicle information and own vehicle surrounding environment information.

Next, various processing operations by the driving support device configured as described above will be explained.

Figure 25:
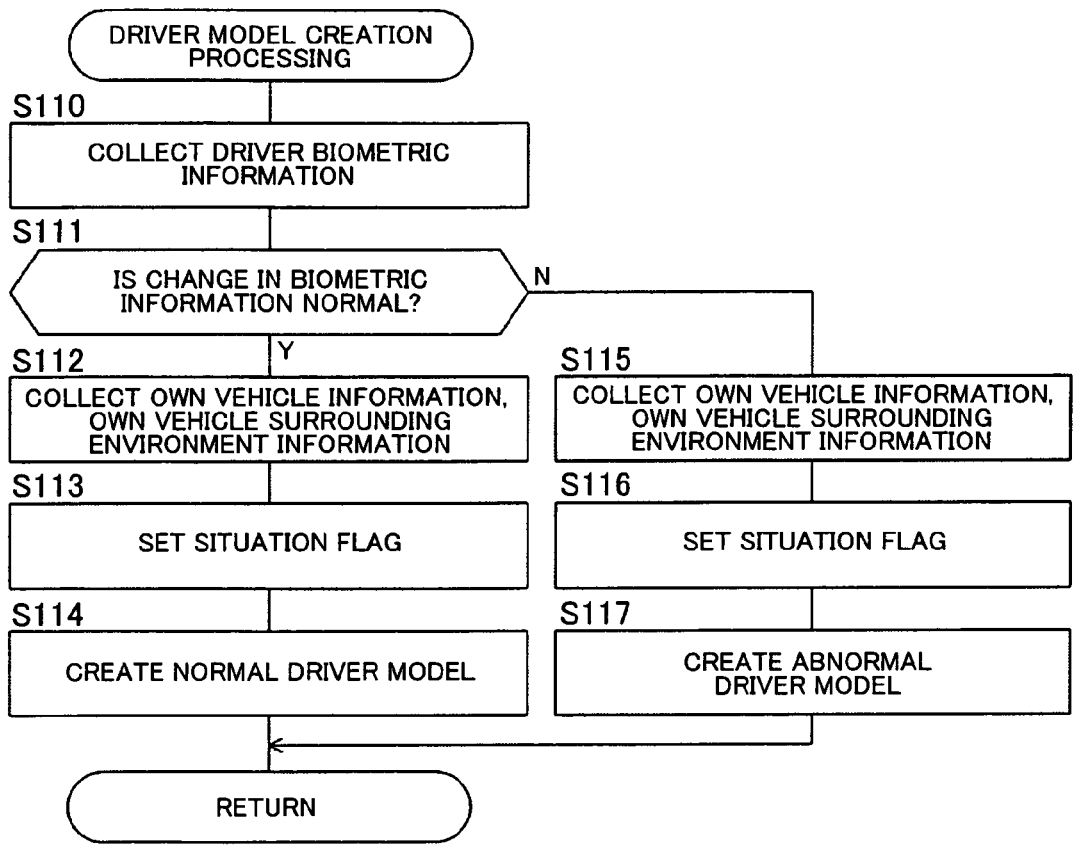
FIG. 25 is a flowchart representing a processing operation of driver model creation processing for creating a driver model of a "usual driving action" (in normal times) of a driver.

FIG. 25 is a flowchart representing a processing operation of the driver model creation processing for creating a driver model of a "usual driving action" (in normal times) of the driver.

In this embodiment, creation of the driver model is executed while the vehicle is traveling. However, setting of the situation flag and creation of the driver model may be performed other than while the vehicle is traveling, meanwhile collection and accumulation of biometric information of the driver, own vehicle information, and driver's surrounding environment information are performed while traveling.

The driver model creating unit 551 collects and accumulates biometric information at each time point from the biometric information obtaining unit 53 while the vehicle is traveling (step 110). Note that various types of information such as the biometric information are collected via the ECU 50 (which will be the same below).

Next, the driver model creating unit 551 monitors the state of change from the collected and accumulated biometric information so as to determine whether the current condition of the driver is a normal condition or not (step 111).

FIG. 26 to FIG. 28 conceptually represent a method of determining whether the driver is in a normal condition or not.

FIG. 26 represents a condition of monitoring a mental change due to dismay or impatience from fluctuation of the heart rate of the driver.

Figure 26A:
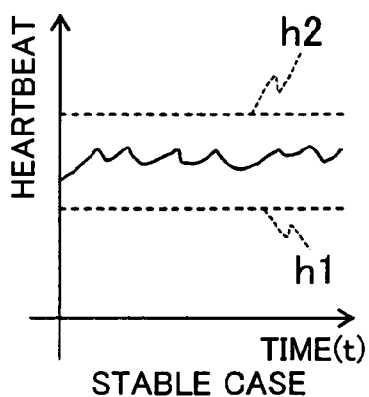
FIG. 26 shows explanatory graphs representing conditions of monitoring a mental change from fluctuation of the heart rate of a driver.

As shown in FIG. 26A, when a measured value of the heart rate is between predetermined lower and upper threshold values h1 and h2, it is determined that the driver is in a normal condition (stable condition).

Figure 26B:
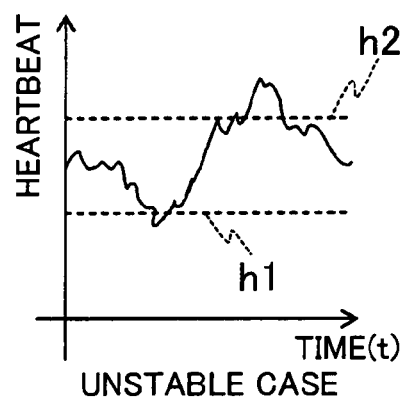

On the other hand, as shown in FIG. 26B, when it is detected that the measured value of the heart rate is equal to or lower than the lower threshold h1, or equal to or higher than the upper threshold h2, it is determined as an abnormal condition (unstable condition) due to dismay or impatience.

Note that, in this embodiment, as shown in FIG. 26B, it is determined as an abnormal condition when deviating from both sides of the lower and upper threshold values h1, h2 within a predetermined time, but it may be determined as an abnormal condition when surpassing one of the threshold values for a predetermined time.

FIG. 27 represents states of monitoring a mental change from Lorenz plot analysis of an electrocardiogram.

In the Lorenz plot analysis, a graph is created with the horizontal axis being a value of RRn and the vertical axis being a value of RRn+1, where RRn is an R-R interval of cardiac potential at an arbitrary time instant n and RRn+1 being an R-R interval of cardiac potential at a next time instant n+1. Here, the R-R interval is a time interval from a peak value to the next peak value of the cardiac potential, and corresponds to an interval between heartbeats.

Figure 27A:
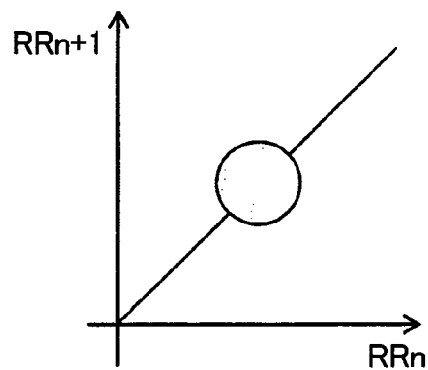
FIG. 27 shows explanatory graphs representing states of monitoring a mental change from Lorenz plot analysis of an electrocardiogram.

According to this Lorenz plot analysis, in an extremely tense condition, as shown in FIG. 27A, the heartbeat intervals become the same intervals, and an aggregation of plot dots concentrates at one spot on the y=x line.

Figure 27B:
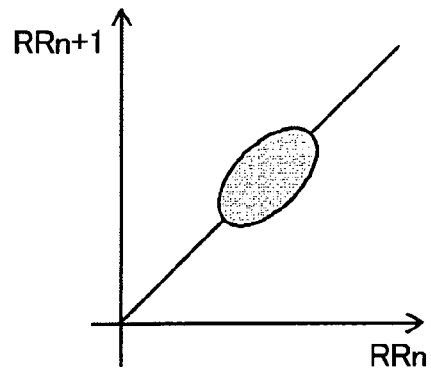

Also, in a moderately tense condition (condition having moderate attentiveness), the heartbeat intervals are observed with moderate swaying, and as shown in FIG. 27B, an aggregation of plot dots is plotted in an elongated shape on the y=x line.

Figure 27C:
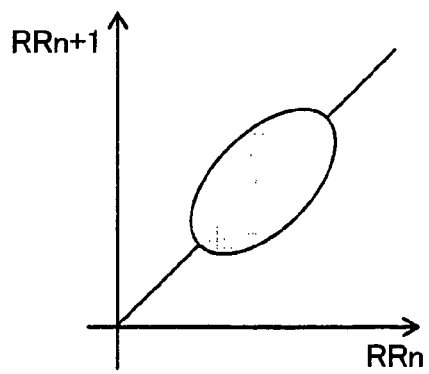

Further, in an inattentive condition, the swaying of the heartbeat intervals becomes large, and as shown in FIG. 27C, there is observed an aggregation of plot dots such that the aggregation expands in an origin direction and also in an orthogonal direction thereto on the y=x line.

Figure 27D:
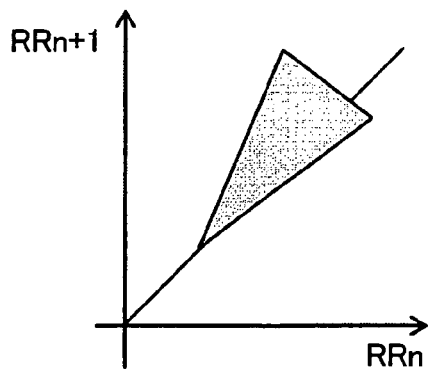

Also, in a sleepy condition, as shown in FIG. 27D, the heartbeat intervals are such that the plot area spreads out in the y=x line direction, but has a width that is narrow on the origin side and tends to widen with distance from the origin.

By this Lorenz plot analysis, a normal condition (moderately tense condition) and an abnormal condition (extremely tense condition, inattentive condition, sleepy condition) are determined.

FIG. 28 represents the case of determining whether being in the normal condition or not by whether it is a condition that the sympathetic nervous system is dominant or a condition that the parasympathetic nervous system is dominant, based on the obtained biometric information.

As shown in FIG. 28, for example, the size of a pupil is measured from a photographed image of the driver, and when the size is dilated, it is determined that the sympathetic nervous system is the most dominant and it is possible to be in an extremely tense condition with low attentiveness. Conversely, when the size of a pupil is a contracted state, it is determined to be in a relaxed state in which the parasympathetic nervous system is dominant and it is possible that the attentiveness is low or the attentiveness is very low depending on the degree of contraction.

On the other hand, in the case of the pupil size indicating that the sympathetic nervous system is moderately dominant, it is determined as the normal condition, a moderately tense condition with high attentiveness.

Including the pupil size, there are determined in advance values for separating into four conditions, that is, extreme tension, moderate tension, relaxed condition (low attentiveness), relaxed condition (extremely low attentiveness) for each of the measurement items of affecting items (heart rate, systolic force, and so on) shown in FIG. 28.

Note that, in creation of a driver model, whether being in the normal condition or not is determined, but in driver biometric information case determination (step 142) in driver biometric information monitoring processing (refer to FIG. 33), which will be described later, five conditions, that is, extremely tense condition, moderately tense condition, inattentive condition, relaxed condition, sleepy condition are determined based on a method explained with reference to FIG. 26 to FIG. 28.

As described above, whether the driver is in the normal condition or not is determined from the biometric information, and when it is normal (step 111; Y), the driver model creating unit 551 collects, as information for creating a normal driver model, own vehicle information and own vehicle surrounding environment information in normal times, from the own vehicle information obtaining unit 51 and the own vehicle surrounding environment information obtaining unit 52 (step 112).

Figure 29:
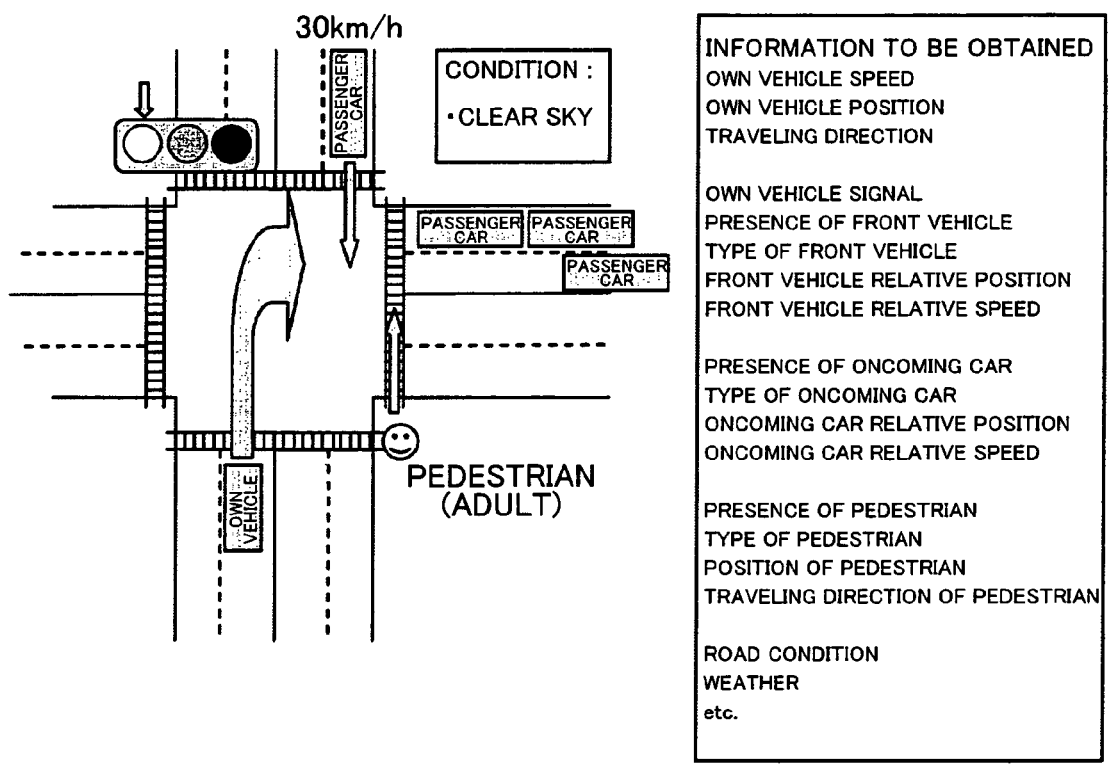
FIG. 29 is an explanatory diagram exemplarily showing own vehicle information and own vehicle surrounding environment information obtained in the own vehicle information obtaining unit and the own vehicle surrounding environment information obtaining unit when turning right in an intersection.

FIG. 29 exemplarily shows own vehicle information and own vehicle surrounding environment information obtained by the own vehicle information obtaining unit 51 and the own vehicle surrounding environment information obtaining unit 52 when turning right in an intersection.

When turning right in the intersection as shown in FIG. 29, as information to be obtained, road type, road condition, own vehicle speed, own vehicle position, traveling direction, status of a traffic light on the own vehicle side (red, green, yellow), presence of a front vehicle, type of the front vehicle, relative position of the front vehicle, relative speed of the front vehicle, presence of an oncoming car, type of the oncoming car, relative position of the oncoming car, relative speed of the oncoming car, presence of a pedestrian, type of the pedestrian, position of the pedestrian, traveling direction of the pedestrian, weather, and the like are obtained.

Note that, in this embodiment, these pieces of information are obtained and used for situation setting, which will be explained later, but it is not necessary to use all of them. The situation setting may be performed based on any part of the information, or conversely, the situation setting may be performed with more detailed information.

The driver model creating unit 551 sets a situation flag according to the situation table 563 (refer to FIG. 24) from the collected own vehicle information and own vehicle surrounding environment information, and accumulates the collected own vehicle information in normal times in the own vehicle information 562 of the corresponding situation (step 113).

Next, the driver model creating unit 551 creates a normal driver model for normal times corresponding to the situation set in step 113 according to the collected and accumulated own vehicle information 562 in normal times (step 114), and returns to the main routine.

On the other hand, whether the driver is in a normal condition or not is determined from biometric information, and when being not normal (step 111; N), the driver model creating unit 551 collects, as information for creating an abnormal driver model, own vehicle information and own vehicle surrounding environment information in abnormal times from the own vehicle information obtaining unit 51 and the own vehicle surrounding environment information obtaining unit 52 (step 115), similarly to normal times.

The driver model creating unit 551 sets a situation flag according to the situation table 563 (refer to FIG. 24) from the collected own vehicle information and own vehicle surrounding environment information, and accumulates the collected own vehicle information in abnormal times in the own vehicle information 562 of the corresponding situation (step 116).

Next, the driver model creating unit 551 creates an abnormal driver model for abnormal times corresponding to the situation set in step 116 according to the collected and accumulated own vehicle information 562 in abnormal times (step 117), and returns to the main routine.

Note that in this embodiment the case of creating a normal driver model and an abnormal driver model according to whether the biometric information is normal or abnormal is explained, but for example, as abnormal conditions, respective driver models may be created according to conditions of biometric information, such that the biometric information is higher/lower than predetermined upper/lower threshold values.

Now, creation of a driver model by the driver model creating unit 551 will be explained.

In this embodiment, a driver model is created by a GMM.

Creation of a driver model in normal times by the driving support device (driver model creating device) and principles related to estimation of a driving operation amount based on the created driver model in this embodiment are as explained with reference to FIG. 1 and in the first embodiment.

Note that characteristic amounts may be created using another combination of information out of all the information obtained in the own vehicle information obtaining unit 51.

In the driving support device of this embodiment, with traveling data 1 (own vehicle information) for each situation configured of accelerator operation amount, vehicle speed, inter-vehicle distance, and so on being learning data, a driver model 2 is created in advance by the EM algorithm by a GMM corresponding to each situation.

Note that the driver model may be created for each driver.

Then, when estimating a driving action (for example, an accelerator operation amount) of the driver, the corresponding driver model 2 is used, and a maximum posterior probability 4 for measured values (V, F, $\Delta$V, . . . ) 3 of the traveling data 1 at a time instant t is calculated, to thereby estimate an accelerator operation amount 5 which is supposed to be operated by the driver.

With each operation amount estimated in this manner being traveling data, the next operation amount is estimated and compared with an actual measured value (own vehicle information) at each time instant, so as to calculate driving action deviation data.

The driving support device of this example is based on an assumption that the driver determines operation amounts of the accelerator pedal and the brake pedal based on the current vehicle speed, inter-vehicle distance, and primary and secondary dynamic characteristic amounts thereof.

Hereinafter, creation of a driver model and principles of estimating a driving action are as explained in the first embodiment.

Note that, in (A) Learning of the driver models, the traveling data 1 are data from actual driving by the driver who is the target of creating a driver model, and traveling data 1 measured and collected in real time when the driver is actually driving are used. Also, off-line learning may be performed using traveling data 1 measured and accumulated in advance.

Further, the overview regarding estimation of a driving action by the maximum posterior probability is as represented in FIG. 2 explained in the first embodiment.

Driver driving action monitoring processing for identifying a condition of a driving action of the driver using driver models created as described above for respective situations will be explained.

Figure 30:
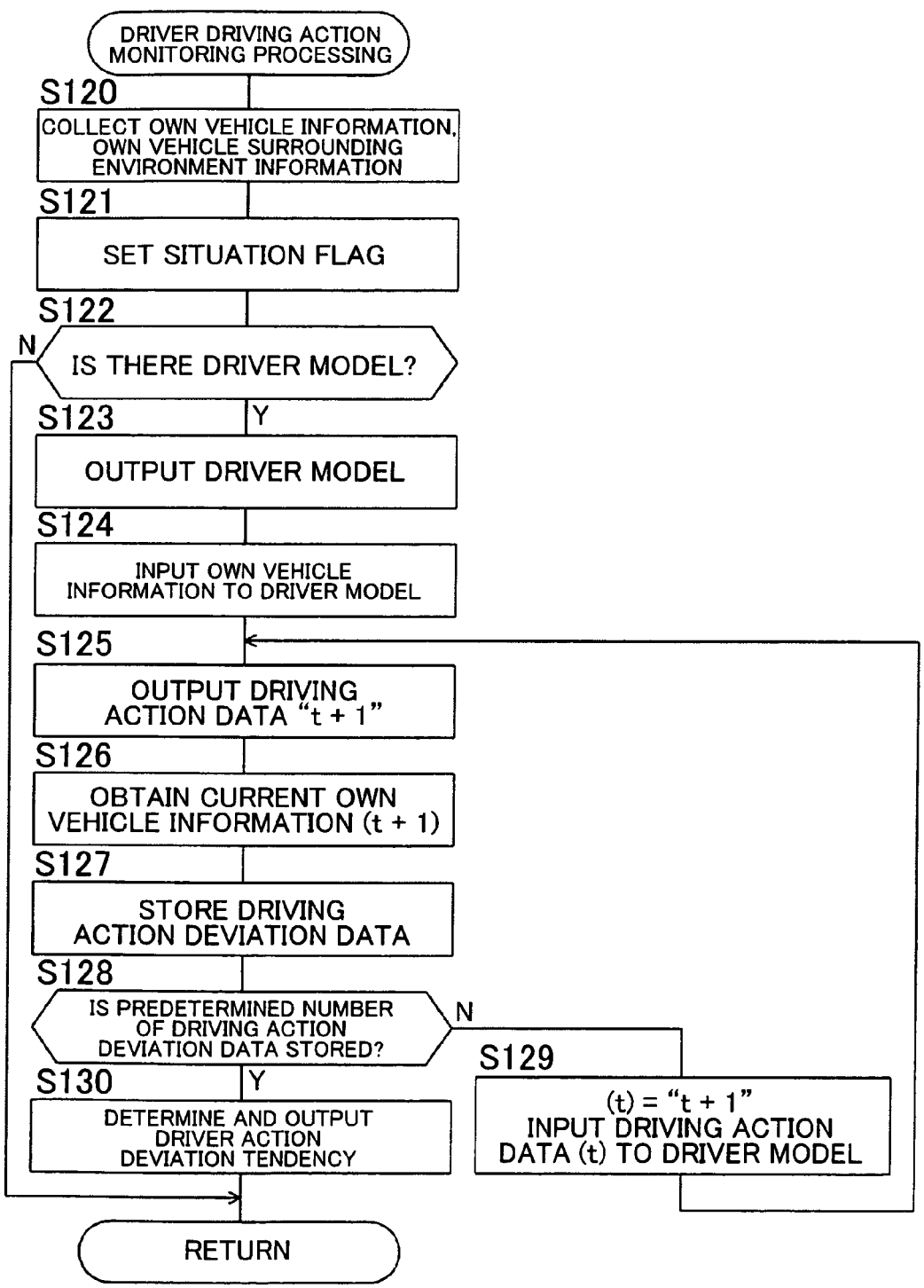
FIG. 30 is a flowchart representing a processing operation of driver driving action monitoring processing.

FIG. 30 is a flowchart representing the processing operation of the driver driving action monitoring processing.

The ECU 50 collects own vehicle information and own vehicle surrounding environment information from the own vehicle information obtaining unit 51 and the own vehicle surrounding environment information obtaining unit 52 (step 120).

Next, as shown in FIG. 31A, the ECU 50 sets a situation flag based on the obtained own vehicle information and own vehicle surrounding environment information (step 121).

Then, the ECU 50 performs matching processing with the situation table 563 based on the set situation flag, and searches for a situation conforming to the current condition of the obtained own vehicle surrounding environment information and so on, to thereby determine whether a corresponding driver model exists or not (step 122).

When the corresponding driver model does not exist (step 122; N), the process returns to the main routine.

On the other hand, as shown in FIG. 31B, when the situation conforming to the current condition is retrieved and the corresponding driver model exists (step 122; Y), the ECU 50 reads the driver model linked to the corresponding situation from the driver model storage unit 552, and outputs it to the driver model output unit 553 (step 123).

Next, the ECU 50 inputs the obtained own vehicle information (actual measured value) obtained at a time instant t by the own vehicle information obtaining unit 51, as initial value (t), to the driver model output unit 553 (step 124). Then, the driver model output unit 553 inputs the own vehicle information (t) at the time instant t to the driver model and calculates the maximum posterior probability, and thereby outputs an estimated value "t+1" of the driving action data (operation amount) at a time instant t+1 to the ECU 50 (step 125).

Next, the ECU 50 obtains the own vehicle information (t+1) at present (time instant t+1) (step 126), calculates driving action deviation data ("t+1"−(t+1)) at the time instant t+1 and stores the data in the driving action deviation data 561 (step 127).

Then, the ECU 50 determines whether a predetermined number of the stored driving action deviation data 561 are accumulated or not (step 128), and when it is lower than the predetermined number (step 128; N), the ECU 50 inputs the estimated value "t+1" of the operation amount estimated in step 125 to the driver model as (t) (step 129), and shifts to step 125, so as to further continue the accumulation of the driving action deviation data 561 at the next time instant (steps 125 to 27).

On the other hand, when the predetermined number of driving action deviation data 561 are accumulated (step 128; Y), the ECU 50 determines a driving action deviation tendency from the condition of the driving action deviation data 561 and outputs it (step 130), and returns to the main routine.

In this embodiment, as the deviation tendency of a driving action, two items of presence of "delay in response speed" and presence of "unsteadiness in operation" are determined.

FIG. 32 conceptually compares an estimated value of the driving operation amount in a normal condition (usual driving) outputted from the driver model output unit 553 with an operation amount (own vehicle information) of the current driving.

In this FIG. 32, the driving operation amount (usual driving) outputted from a driver model represents an output value of an operation amount of the highest probability as a driving action, which is usually performed by the driver in normal times, when an initial value of the current driving operation amount is inputted to the driver model, and represents a virtual operation amount denoting that usually the driving should be performed in this manner (should be of such an operation amount) in normal times.

By comparing this virtual operation amount with the current driving operation amount, tendencies of delay in response speed and unsteadiness in operation are determined.

For example, as shown in FIG. 32A, when the operation amount estimated by the driver model increases over time, and if the operation amount by the own vehicle information is obtained by the own vehicle information obtaining unit 51 after a predetermined time has passed, it is determined that there is a tendency of delay in response speed.

Also, as shown in FIG. 32B, when the operation amount according to the obtained own vehicle information increases or decreases over time as compared to the operation amount estimated by the driver model, and if the increased/decreased amount (absolute value of driving action deviation data) is equal to or larger than a predetermined value, it is determined that there is unsteadiness in driving operation.

On the other hand, when the operation amount estimated by the driver model and the operation amount by the obtained own vehicle information almost match, that is, when a condition where the absolute value of the driving action deviation data is equal to or lower than a predetermined value continues, it is determined as a normal condition with no response delay and no unsteadiness.

Next, monitoring processing of biometric information of the driver while traveling will be explained according to the flowchart in FIG. 33.

First, the ECU 50 collects and accumulates biometric information at each time point from the biometric information obtaining unit 53 while the vehicle is traveling (step 141).

Then, the ECU 50 monitors the state of change from the collected and accumulated biometric information to thereby determine the condition (case) of the current driver biometric information using the same method as the method explained with reference to FIG. 26 to FIG. 28 (step 142), and returns to the main routine.

Note that the driver biometric information monitoring processing explained above can be used in common for the driver biometric information collection (step 110) and the determination as to whether a change in the driver biometric information is normal or not (step 111), in the driver model creation processing while traveling that is explained with reference to FIG. 25.

In this case, in the driver model creation processing, it is monitored in step 111 that the driver's condition is a normal condition. On the other hand, as explained in FIG. 25, when the driver's condition is not a normal condition, what condition it corresponds to is also determined according to FIG. 26 to FIG. 28 and outputted.

Note that, when the above determination is used in common, either the driver model creating unit 551 or the ECU 50 performs the determination.

Also, as shown in FIGS. 34A, 34B, the normal condition and the sleepy, fatigued conditions may be determined from the condition of an eye of the driver.

This determination from the condition of an eye may be used in one or both of the driver model creation processing (step 111) and the driver biometric information monitoring processing (step 142).

Specifically, as shown in FIG. 34A, as the condition of the driver, the number of blinks, blinking time, opening degree of an eyelid, and movement of a sight line are detected by image processing, and the sleepy condition is determined according to values or conditions thereof.

Also, as shown in FIG. 34B, fatigue is determined when the number of blinks is increased, when the movement of an eyelid is twitching, when rubbing an eye, or when massaging a part between the eyes.

Figure 35:
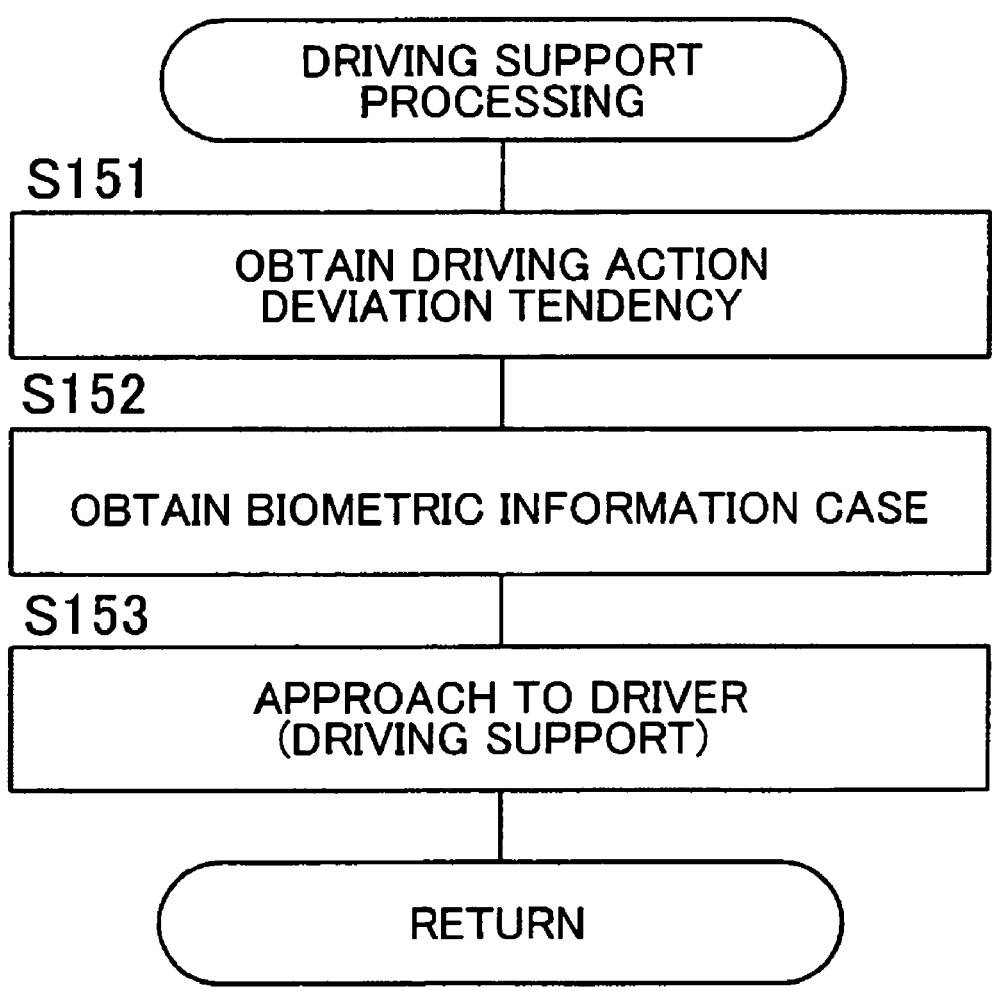
FIG. 35 is a flowchart representing an operation of driving support processing based on a driver driving condition and biometric information case.

FIG. 35 is a flowchart representing the operation of driving support processing based on the driving condition and the biometric information case of the driver.

The ECU 50 obtains the driving action deviation tendency determined and outputted in step 130 of the driver driving action monitoring processing (FIG. 30) as the condition of the driver (step 151), and obtains the driver biometric information case determined and outputted in step 142 of the driver biometric information monitoring processing (FIG. 33) (step 152).

Then, the ECU 50 determines the contents of driving support from the obtained driving action deviation tendency and biometric information case and performs an approach to the driver (step 153), and returns to the main routine.

FIG. 36 shows tables that represent conditions (a) of the driver estimated from the obtained driving action and biometric information case, and the contents of driving support that is performed corresponding to the estimated condition of the driver.

Note that the table of FIG. 36B is stored in the ROM of the ECU 50.

As shown in FIG. 36A, the condition of the driver, such as being distracted by something, getting tired, driving carelessly, being sleepy, being impatient, looking away, or the like, is estimated according to combinations of respective driving actions (response delay, unsteadiness, response delay+unsteadiness, none of them) and respective biometric information cases (extremely tense condition, moderately tense condition, inattentive condition, relaxed condition, sleepy condition).

Then, responding to each condition estimated from each of the combinations, as shown in FIG. 36B, the ECU 50 performs a driving support from the information providing unit 54, such as alerting by voice or vibration, providing facility information and suggesting to take a break, alerting+α1, diverting the mood by providing information, or the like.

Note that among the driving supports in FIG. 36, for +α1, which is concentrating on other than driving and hence is dangerous, the ECU 50 performs control such as warning to pay attention and automatically increasing the inter-vehicle distance from the front vehicle.

Also, for +α2, the ECU 50 warns the driver to concentrate on driving, and performs, using a conversation function or a sensor, a research on what causes the driver to feel so burdened to be careless about driving, and then performs an operation to solve the problem of the driver, such as suggesting a break to be refreshed, giving an advice about the problem, or the like.

Further, for +α3, the ECU 50 warns the driver to wake up, and issues guidance such as suggesting to take a break as soon as possible, or the like.

Also, as the contents of warning, the ECU 50 may give a specific explanation, for making the driver agree easily, about the reason for warning, what was the problem in driving operation or in biometric information and why it was the problem, or the like.

Although one embodiment related to the driver model creating device and the driving support device of the present invention has been explained above, the present invention is not limited to the explained embodiment, and may be modified in various ways within the scope described in the claims.

For example, in the explained embodiment, the case where the contents of driving support are determined from the determined driving action and biometric information case is explained, but the driving support contents may be determined from the determined driving action.

EXPLANATION OF REFERENCE NUMERALS

10 DRIVER MODEL GENERATING UNIT
101 DRIVER INFORMATION OBTAINING UNIT
102 TRAVELING DATA OBTAINING UNIT
103 JOINT PROBABILITY DENSITY DISTRIBUTION CALCULATING UNIT
104 JOINT PROBABILITY DENSITY FUNCTION PARAMETER STORAGE UNIT
11 DRIVING ACTION ESTIMATING UNIT
111 DRIVER INFORMATION OBTAINING UNIT
112 TRAVELING DATA OBTAINING UNIT
113 DRIVER MODEL SELECTING UNIT
114 MAXIMUM POSTERIOR PROBABILITY CALCULATING UNIT
115 CHARACTERISTIC AMOUNT x ESTIMATED VALUE OUTPUT UNIT
50 ECU
51 OWN VEHICLE INFORMATION OBTAINING UNIT
52 OWN VEHICLE SURROUNDING ENVIRONMENT INFORMATION OBTAINING UNIT
521 VEHICLE SURROUNDING INFORMATION OBTAINING UNIT
522 ROAD INFORMATION OBTAINING UNIT
523 NETWORK UNIT
53 BIOMETRIC INFORMATION OBTAINING UNIT
54 INFORMATION PROVIDING UNIT
55 DRIVER MODEL PROCESSING UNIT
551 DRIVER MODEL CREATING UNIT
552 DRIVER MODEL STORAGE UNIT
553 DRIVER MODEL OUTPUT UNIT
56 DATA STORAGE UNIT

The invention claimed is:

1. A driving action estimating device, comprising:
   a driver model for accelerator pedal operation and a driver model for brake pedal operation, each driver model being in the form of a Gaussian mixture model calculated by an EM algorithm, with time-series data of N types of characteristic amounts detected during travel of a vehicle as learning data, as a probability distribution of existence of the respective learning data in N dimensional spaces;
   characteristic amount obtaining means for obtaining at least one or more characteristic amounts from the N types excluding a certain characteristic amount x;
   maximum posterior probability calculating means for calculating a maximum posterior probability in the driver model for the obtained characteristic amount; and
   output means for outputting an estimated value of the certain characteristic amount x for the obtained characteristic amount based on the calculated maximum posterior probability.

2. The driving action estimating device according to claim 1, wherein the N types of characteristic amounts include a time change amount for n types (n<N) of characteristic amounts.

3. The driving action estimating device according to claim 1, wherein the characteristic amount x includes an operation amount of an operation device operated directly by a driver and a time change amount of the operation amount.

4. A driving support device, comprising:
   a driving action estimating device according to claim 1, wherein the learning data comprises an accelerator operation amount, a brake operation amount, a vehicle speed of the driver's vehicle, and an inter-vehicle distance between the driver's vehicle and a leading vehicle immediately ahead of the driver's vehicle as characteristic amounts, and estimates an accelerator operation amount and a brake operation amount as the characteristic amounts x;
   traveling data obtaining means for obtaining the vehicle speed of the driver's vehicle and the inter-vehicle distance;
   traveling control means for performing automatic cruise control with respect to the leading vehicle by controlling an engine throttle and a brake pedal according to an accelerator operation amount and a brake operation amount that are estimated with respect to the obtained traveling data by the driving action estimating device.

5. A vehicle evaluating system, comprising:
   a driving action estimating device according to claim 1, wherein the learning data comprises an accelerator operation amount, a brake operation amount, a vehicle speed of the driver's vehicle, and an inter-vehicle distance between the driver's vehicle and a leading vehicle immediately ahead of the driver's vehicle as characteristic amounts, and estimates an accelerator operation amount and a brake operation amount as the characteristic amounts x;

means for obtaining vehicle performance data for the driver's vehicle as a target of evaluation;

means for obtaining traveling data and a traveling route model for simulation;

vehicle dynamics calculating means for estimating a behavior of the driver's vehicle including acceleration of the driver's vehicle as a target of evaluation with respect to an accelerator operation amount and a brake operation amount that are obtained by inputting the obtained traveling data and traveling route model to the driving action estimating device; and evaluating means for evaluating traveling performance of the driver's vehicle as a target of evaluation from the estimated behavior of the vehicle.

6. A driving support device, comprising:

driver model obtaining means for obtaining a driver model for accelerator pedal operation and a driver model for brake pedal operation under normal conditions, each driver model being in the form of a Gaussian mixture model calculated by an EM algorithm, with time-series data of N types of characteristic amounts detected during travel of a vehicle as learning data, as a probability distribution of existence of the respective learning data in N dimensional spaces;

driving operation estimating means for estimating a driving operation which is usually operated in a normal condition using the obtained driver model;

driving action determining means for determining a driving action of a driver from the estimated driving operation and a driving operation based on current driving operation information; and driving support means for providing driving support according to the determined driving action.

7. The driving support device according to claim 6, wherein the driver model obtaining means obtains a driver model corresponding to a current traveling environment from driver models of driving operations in a normal condition created for each traveling environment.

8. The driving support device according to claim 6 further comprising:

driver condition determining means for determining a condition of a driver from biometric information of the driver, wherein the driving support means performs a driving support according to the determined driving action and the determined driver condition.

9. The driving support device according to claim 6, wherein the driving support means performs at least one driving support function selected from the group consisting of warnings by voice or image, providing information, vibration, and guidance to a rest station.

10. A driving action determining device, comprising:

driver model obtaining means for obtaining a driver model for accelerator pedal operation and a driver model for brake pedal operation under normal conditions, each driver model being in the form of a Gaussian mixture model calculated by an EM algorithm, with time-series data of N types of characteristic amounts detected during travel of a vehicle as learning data, as a probability distribution of existence of the respective learning data in N dimensional spaces;

driving operation estimating means for estimating, as driving operations, a brake pedal operation and an accelerator pedal operation, which operations are usually made under the normal conditions, using the obtained driver models; and driving action determining means for determining a brake pedal operation and an accelerator operation of a driver from the estimated driving operations and current driving operations based on current driving operation information.

* * * * *